United States Patent
Connell et al.

(10) Patent No.: US 12,304,281 B2
(45) Date of Patent: May 20, 2025

(54) SYSTEMS AND METHODS OF MANAGING A POWER SOURCE OF A VEHICLE

(71) Applicant: Bergstrom, Inc., Rockford, IL (US)

(72) Inventors: Brett Sean Connell, Winnebago, IL (US); Aaron Dale Sullivan, Rockford, IL (US)

(73) Assignee: BERGSTROM, INC., Rockford, IL (US)

( * ) Notice: Subject to any disclaimer, the term of this patent is extended or adjusted under 35 U.S.C. 154(b) by 0 days.

(21) Appl. No.: 18/475,062

(22) Filed: Sep. 26, 2023

(65) Prior Publication Data

US 2024/0092146 A1 Mar. 21, 2024

Related U.S. Application Data

(63) Continuation of application No. 17/224,052, filed on Apr. 6, 2021, now Pat. No. 11,780,292, which is a
(Continued)

(51) Int. Cl.
*G07C 5/00* (2006.01)
*B60H 1/00* (2006.01)
(Continued)

(52) U.S. Cl.
CPC ..... *B60H 1/00985* (2013.01); *B60H 1/00771* (2013.01); *G05D 23/1905* (2013.01);
(Continued)

(58) Field of Classification Search
CPC ............ B60H 1/00985; B60H 1/00771; G05D 23/1905; G05D 23/1934; G06Q 10/00; G06Q 10/06; G07C 5/008; G08G 1/20
See application file for complete search history.

(56) References Cited

U.S. PATENT DOCUMENTS 2,156,426 A 5/1939 Brown et al.
2,722,050 A 11/1955 Shank
(Continued)

FOREIGN PATENT DOCUMENTS

CN 1468409 A 1/2004
CN 2883071 Y 3/2007
(Continued)

OTHER PUBLICATIONS

Alfa Laval Website http://www.alfalaval.com/ecore-Java/WebObjects/ecoreJava.woa/wa/shoNode?siteNodeIID=1668&cont . . . ; date last visited May 18, 2007; 1 page.
(Continued)

*Primary Examiner* — Gertrude Arthur Jeanglaude
(74) *Attorney, Agent, or Firm* — Morgan, Lewis & Bockius LLP

(57) ABSTRACT

The various embodiments described herein include methods, computer-readable storage media, and systems for managing a power source of a vehicle. In one aspect, a method includes receiving, from a communicatively coupled vehicle, one or more parameters associated with a power source that is used to power a climate control system of the vehicle. The method further includes in accordance with a determination that a performance inefficiency exists based at least in part on the one or more parameters associated with the power source, generating an operational setting instruction in relating to an efficient operational setting and transmitting the operational setting instruction to the vehicle to control the power source. The efficient operational setting is determined to reduce a drain of the power source such that the performance inefficiency no longer exists.

20 Claims, 14 Drawing Sheets

Related U.S. Application Data continuation of application No. 16/546,141, filed on Aug. 20, 2019, now Pat. No. 10,967,709, which is a continuation of application No. 15/722,860, filed on Oct. 2, 2017, now Pat. No. 10,427,496, which is a continuation of application No. 15/064,552, filed on Mar. 8, 2016, now Pat. No. 9,783,024.

(60) Provisional application No. 62/130,399, filed on Mar. 9, 2015.

(51) Int. Cl.
  *G05D 23/19* (2006.01)
  *G06Q 10/00* (2023.01)
  *G06Q 10/06* (2023.01)
  *G08G 1/00* (2006.01)

(52) U.S. Cl.
  CPC ......... *G05D 23/1934* (2013.01); *G06Q 10/00* (2013.01); *G06Q 10/06* (2013.01); *G07C 5/008* (2013.01); *G08G 1/20* (2013.01)

(56) References Cited

U.S. PATENT DOCUMENTS

| | | |
|---|---|---|
| 2,789,234 A | 6/1956 | Lambert et al. |
| 3,176,502 A | 4/1965 | Cizek et al. |
| 3,225,819 A | 12/1965 | Stevens |
| 3,360,958 A | 1/1968 | Miner |
| 3,590,910 A | 7/1971 | Lorenz |
| 3,627,030 A | 12/1971 | Lorenz |
| 3,807,087 A | 4/1974 | Staats |
| 3,844,130 A | 10/1974 | Wahnish |
| 3,880,224 A | 4/1975 | Weil |
| 3,885,398 A | 5/1975 | Dawkins |
| 3,938,349 A | 2/1976 | Ueno |
| 3,948,060 A | 4/1976 | Gaspard |
| 3,995,443 A | 12/1976 | Iversen |
| 4,015,182 A | 3/1977 | Erdman |
| 4,034,801 A | 7/1977 | Bermstein |
| 4,071,080 A | 1/1978 | Bridgers |
| 4,217,764 A | 8/1980 | Armbruster |
| 4,266,405 A | 5/1981 | Trask |
| 4,271,677 A | 6/1981 | Harr |
| 4,280,330 A | 7/1981 | Harris et al. |
| 4,324,286 A | 4/1982 | Brett |
| 4,359,875 A | 11/1982 | Ohtani |
| 4,383,802 A | 5/1983 | Gianni et al. |
| 4,391,321 A | 7/1983 | Thunberg |
| 4,412,425 A | 11/1983 | Fukami et al. |
| 4,448,157 A | 5/1984 | Eckstein et al. |
| 4,459,519 A | 7/1984 | Erdman |
| 4,577,679 A | 3/1986 | Hibshman |
| 4,604,036 A | 8/1986 | Sutou et al. |
| 4,617,472 A | 10/1986 | Slavik |
| 4,641,502 A | 2/1987 | Aldrich et al. |
| 4,658,593 A | 4/1987 | Stenvinkel |
| 4,667,480 A | 5/1987 | Bessler |
| 4,694,798 A | 9/1987 | Kato et al. |
| 4,748,825 A | 6/1988 | King |
| 4,825,663 A | 5/1989 | Nijar et al. |
| 4,841,733 A | 6/1989 | Dussault et al. |
| 4,856,078 A | 8/1989 | Konopka |
| 4,893,479 A | 1/1990 | Gillett et al. |
| 4,897,798 A | 1/1990 | Cler |
| 4,905,478 A | 3/1990 | Matsuda et al. |
| 4,945,977 A | 8/1990 | D'Agaro |
| 4,947,657 A | 8/1990 | Kalmbach |
| 4,952,283 A | 8/1990 | Besik |
| 4,982,576 A | 1/1991 | Proctor et al. |
| 5,025,634 A | 6/1991 | Dressler |
| 5,046,327 A | 9/1991 | Walker |
| 5,067,652 A | 11/1991 | Enander |
| 5,095,308 A | 3/1992 | Hewitt |
| 5,125,236 A | 6/1992 | Clancey et al. |
| 5,170,639 A | 12/1992 | Datta |
| 5,205,781 A | 4/1993 | Kanno et al. |
| 5,230,719 A | 7/1993 | Berner et al. |
| 5,269,153 A | 12/1993 | Cawley |
| 5,275,012 A | 1/1994 | Dage et al. |
| 5,307,645 A | 5/1994 | Pannell |
| 5,316,074 A | 5/1994 | Isaji et al. |
| 5,324,229 A | 6/1994 | Weisbecker |
| 5,327,997 A | 7/1994 | Nash, Jr. et al. |
| 5,333,678 A | 8/1994 | Mellum et al. |
| 5,361,593 A | 11/1994 | Dauvergne |
| 5,376,866 A | 12/1994 | Erdman |
| 5,396,779 A | 3/1995 | Voss |
| 5,402,844 A | 4/1995 | Elluin |
| 5,404,730 A | 4/1995 | Westermeyer |
| 5,426,953 A | 6/1995 | Meckler |
| 5,465,589 A | 11/1995 | Bender et al. |
| 5,497,941 A | 3/1996 | Numazawa et al. |
| 5,501,267 A | 3/1996 | Iritani et al. |
| 5,502,365 A | 3/1996 | Nanbu et al. |
| 5,524,442 A | 6/1996 | Bergmen, Jr. et al. |
| 5,528,901 A | 6/1996 | Willis |
| 5,562,538 A | 10/1996 | Suyama |
| 5,586,613 A | 12/1996 | Ehsani |
| 5,605,058 A | 2/1997 | Kurachi et al. |
| 5,641,016 A | 6/1997 | Isaji et al. |
| 5,647,534 A | 7/1997 | Kelz et al. |
| 5,657,638 A | 8/1997 | Erdman et al. |
| 5,682,757 A | 11/1997 | Peterson |
| 5,720,181 A | 2/1998 | Karl et al. |
| 5,727,396 A | 3/1998 | Boyd |
| 5,752,391 A | 5/1998 | Ozaki et al. |
| 5,761,918 A | 6/1998 | Jackson et al. |
| 5,775,415 A | 7/1998 | Yoshini et al. |
| 5,782,610 A | 7/1998 | Ikeda |
| 5,819,549 A | 10/1998 | Sherwood |
| 5,896,750 A | 4/1999 | Karl |
| 5,898,995 A | 5/1999 | Ghodbane |
| 5,899,081 A | 5/1999 | Evans et al. |
| 5,901,572 A | 5/1999 | Peiffer et al. |
| 5,901,780 A | 5/1999 | Zeigler et al. |
| 5,921,092 A | 7/1999 | Behr et al. |
| 5,934,089 A | 8/1999 | Magakawa et al. |
| 5,982,643 A | 11/1999 | Phlipot |
| 5,996,363 A | 12/1999 | Kurachi et al. |
| 6,016,662 A | 1/2000 | Tanaka et al. |
| 6,021,043 A | 2/2000 | Horng |
| 6,028,406 A | 2/2000 | Birk |
| 6,029,465 A | 2/2000 | Bascobert |
| 6,038,877 A | 3/2000 | Peiffer et al. |
| 6,038,879 A | 3/2000 | Turcotte |
| 6,059,016 A | 5/2000 | Rafalovich et al. |
| 6,072,261 A | 6/2000 | Lin |
| 6,073,456 A | 6/2000 | Kawai et al. |
| 6,111,731 A | 8/2000 | Cepynsky |
| 6,112,535 A | 9/2000 | Hollenbeck |
| 6,122,929 A | 9/2000 | Yamazaki |
| 6,125,642 A | 10/2000 | Seener et al. |
| 6,134,901 A | 10/2000 | Harvest et al. |
| 6,152,217 A | 11/2000 | Ito et al. |
| 6,185,959 B1 | 2/2001 | Zajac |
| 6,193,475 B1 | 2/2001 | Rozek |
| 6,205,795 B1 | 3/2001 | Backman et al. |
| 6,205,802 B1 | 3/2001 | Drucker et al. |
| 6,209,333 B1 | 4/2001 | Bascobert |
| 6,209,622 B1 | 4/2001 | Lagace et al. |
| 6,213,867 B1 | 4/2001 | Yazici |
| 6,230,507 B1 | 5/2001 | Ban et al. |
| 6,232,687 B1 | 5/2001 | Hollenbeck et al. |
| 6,253,563 B1 | 7/2001 | Ewert et al. |
| 6,265,692 B1 | 7/2001 | Umebayahi et al. |
| 6,276,161 B1 | 8/2001 | Peiffer et al. |
| 6,282,919 B1 | 9/2001 | Rockenfeller |
| 6,318,103 B1 | 11/2001 | Rieger et al. |
| 6,351,957 B2 | 3/2002 | Hara |
| 6,405,793 B1 | 6/2002 | Ghodbane et al. |
| 6,411,059 B2 | 6/2002 | Frugier et al. |
| 6,453,678 B1 | 9/2002 | Sundhar |
| 6,457,324 B2 | 10/2002 | Zeigler et al. |

(56) References Cited

U.S. PATENT DOCUMENTS

| | | |
|---|---|---|
| 6,467,279 B1 | 10/2002 | Backman et al. |
| 6,474,081 B1 | 11/2002 | Feuerecker |
| 6,490,876 B2 | 12/2002 | Derryberry et al. |
| 6,530,426 B1 | 3/2003 | Kishita et al. |
| 6,543,245 B1 | 4/2003 | Waldschmidt |
| 6,571,566 B1 | 6/2003 | Temple et al. |
| 6,575,228 B1 | 6/2003 | Ragland et al. |
| 6,626,003 B1 | 9/2003 | Kortüm et al. |
| 6,651,448 B2 | 11/2003 | Ross |
| 6,662,592 B2 | 12/2003 | Ross |
| 6,675,601 B2 | 1/2004 | Ebara |
| 6,684,863 B2 | 2/2004 | Dixon et al. |
| 6,725,134 B2 | 4/2004 | Dillen et al. |
| 6,745,585 B2 | 6/2004 | Kelm et al. |
| 6,748,750 B2 | 6/2004 | Choi |
| 6,758,049 B2 | 7/2004 | Adachi et al. |
| 6,889,762 B2 | 5/2005 | Zeigler et al. |
| 6,932,148 B1 | 8/2005 | Brummett et al. |
| 6,939,114 B2 | 9/2005 | Iwanami et al. |
| 6,965,818 B2 | 11/2005 | Koenig et al. |
| 6,981,544 B2 | 1/2006 | Iwanami et al. |
| 6,992,419 B2 | 1/2006 | Kim et al. |
| 7,131,281 B2 | 11/2006 | Salim et al. |
| 7,135,799 B2 | 11/2006 | Rittmeyer |
| 7,150,159 B1 | 12/2006 | Brummett et al. |
| 7,246,502 B2 | 7/2007 | Hammonds et al. |
| 7,316,119 B2 | 1/2008 | Allen |
| 7,350,368 B2 | 4/2008 | Heberle et al. |
| 7,385,323 B2 | 6/2008 | Takahashi et al. |
| 7,591,143 B2 | 9/2009 | Zeigler et al. |
| 7,591,303 B2 | 9/2009 | Ziegler et al. |
| 7,614,242 B1 | 11/2009 | Quesada Saborio |
| 7,637,031 B2 | 12/2009 | Salim et al. |
| 7,765,824 B2 | 8/2010 | Wong et al. |
| 7,821,175 B2 | 10/2010 | Ionel et al. |
| 7,925,426 B2 * | 4/2011 | Koebler ............... G07C 5/085 |
| | | 701/123 |
| 7,932,658 B2 | 4/2011 | Ionel |
| 8,001,799 B2 | 8/2011 | Obayashi et al. |
| 8,141,377 B2 | 3/2012 | Connell |
| 8,156,754 B2 | 4/2012 | Hong et al. |
| 8,276,892 B2 | 10/2012 | Narikawa et al. |
| 8,492,948 B2 | 7/2013 | Wang et al. |
| 8,517,087 B2 | 8/2013 | Zeigler et al. |
| 8,821,092 B2 | 9/2014 | Nambara et al. |
| 8,841,813 B2 | 9/2014 | Junak et al. |
| 8,905,071 B2 | 12/2014 | Coombs et al. |
| 8,919,140 B2 | 12/2014 | Johnson et al. |
| 8,947,531 B2 | 2/2015 | Fischer et al. |
| 9,157,670 B2 | 10/2015 | Kreeley et al. |
| 9,216,628 B2 | 12/2015 | Self et al. |
| 9,221,409 B1 | 12/2015 | Gauthier et al. |
| 9,327,578 B2 | 5/2016 | Itoh |
| 9,670,933 B2 | 6/2017 | Yoo et al. |
| 9,783,024 B2 * | 10/2017 | Connell ............... G06Q 10/00 |
| 9,878,591 B2 | 1/2018 | Taniguchi et al. |
| 10,267,546 B2 | 4/2019 | Evans et al. |
| 10,427,496 B2 * | 10/2019 | Connell ............... G07C 5/008 |
| 2001/0010261 A1 | 8/2001 | Oomura et al. |
| 2001/0013409 A1 | 8/2001 | Burk |
| 2001/0015070 A1 | 8/2001 | Junichiro |
| 2002/0020183 A1 | 2/2002 | Hayashi |
| 2002/0026801 A1 | 3/2002 | Yamashita |
| 2002/0036081 A1 | 3/2002 | Ito et al. |
| 2002/0042248 A1 | 4/2002 | Vincent et al. |
| 2002/0078700 A1 | 6/2002 | Kelm et al. |
| 2002/0078705 A1 | 6/2002 | Schlosser et al. |
| 2002/0084769 A1 | 7/2002 | Iritani et al. |
| 2002/0108384 A1 | 8/2002 | Higashiyama |
| 2002/0112489 A1 | 8/2002 | Egawa et al. |
| 2002/0157412 A1 | 10/2002 | Iwanami et al. |
| 2002/0157413 A1 | 10/2002 | Iwanami et al. |
| 2003/0041603 A1 | 3/2003 | Tada et al. |
| 2003/0105567 A1 | 6/2003 | Koenig et al. |
| 2003/0106332 A1 | 6/2003 | Okamoto |
| 2004/0060312 A1 | 4/2004 | Horn et al. |
| 2004/0079098 A1 | 4/2004 | Uno et al. |
| 2004/0112074 A1 | 6/2004 | Komura et al. |
| 2004/0168449 A1 | 9/2004 | Homan et al. |
| 2004/0216477 A1 | 11/2004 | Yamasaki et al. |
| 2004/0221599 A1 | 11/2004 | Hille et al. |
| 2004/0250560 A1 | 12/2004 | Ikura et al. |
| 2004/0256082 A1 | 12/2004 | Bracciano |
| 2005/0016196 A1 | 1/2005 | Kadle et al. |
| 2005/0109499 A1 | 5/2005 | Iwanami et al. |
| 2005/0161211 A1 | 7/2005 | Zeigler et al. |
| 2005/0230096 A1 | 10/2005 | Yamaoka |
| 2005/0235660 A1 | 10/2005 | Pham |
| 2005/0257545 A1 | 11/2005 | Ziehr et al. |
| 2006/0042284 A1 | 3/2006 | Heberle et al. |
| 2006/0080980 A1 | 4/2006 | Lee et al. |
| 2006/0102333 A1 | 5/2006 | Zeigler et al. |
| 2006/0118290 A1 | 6/2006 | Klassen et al. |
| 2006/0151163 A1 | 7/2006 | Zeigler et al. |
| 2006/0151164 A1 | 7/2006 | Zeigler et al. |
| 2006/0254309 A1 | 11/2006 | Takeuchi et al. |
| 2006/0277936 A1 | 12/2006 | Norden |
| 2007/0039336 A1 | 2/2007 | Wu |
| 2007/0070605 A1 | 3/2007 | Straznicky et al. |
| 2007/0101760 A1 | 5/2007 | Bergander |
| 2007/0103014 A1 | 5/2007 | Sumiya et al. |
| 2007/0117167 A1 | 5/2007 | Malinowski |
| 2007/0131408 A1 | 6/2007 | Zeigler et al. |
| 2007/0144723 A1 | 6/2007 | Aubertin et al. |
| 2007/0144728 A1 | 6/2007 | Kinmartin et al. |
| 2007/0163276 A1 | 7/2007 | Braun et al. |
| 2007/0227167 A1 | 10/2007 | Shapiro |
| 2007/0251256 A1 | 11/2007 | Pham et al. |
| 2007/0295017 A1 | 12/2007 | Pannell |
| 2008/0017347 A1 | 1/2008 | Chung et al. |
| 2008/0110185 A1 | 5/2008 | Veettil et al. |
| 2008/0156887 A1 | 7/2008 | Stanimirovic |
| 2008/0196436 A1 | 8/2008 | Connell |
| 2008/0196877 A1 | 8/2008 | Zeigler et al. |
| 2008/0209924 A1 | 9/2008 | Yoon et al. |
| 2008/0295535 A1 | 12/2008 | Robinet |
| 2009/0140590 A1 | 6/2009 | Hung |
| 2009/0211280 A1 | 8/2009 | Alston |
| 2009/0229288 A1 | 9/2009 | Alston et al. |
| 2009/0241592 A1 | 10/2009 | Stover |
| 2009/0249802 A1 | 10/2009 | Nemesh et al. |
| 2009/0301702 A1 | 12/2009 | Zeigler et al. |
| 2010/0009620 A1 | 1/2010 | Kawato et al. |
| 2010/0019047 A1 | 1/2010 | Flick |
| 2010/0127591 A1 | 5/2010 | Court et al. |
| 2010/0186433 A1 | 7/2010 | Galante et al. |
| 2010/0218530 A1 | 9/2010 | Melbostad et al. |
| 2010/0263395 A1 | 10/2010 | Adachi et al. |
| 2010/0281901 A1 | 11/2010 | Kawase et al. |
| 2010/0293966 A1 | 11/2010 | Yokomachi |
| 2010/0297517 A1 | 11/2010 | Maier |
| 2011/0000240 A1 | 1/2011 | Yamada et al. |
| 2011/0088417 A1 | 4/2011 | Kayser |
| 2011/0120146 A1 | 5/2011 | Ota et al. |
| 2011/0126566 A1 | 6/2011 | Jones et al. |
| 2011/0174014 A1 | 7/2011 | Scarcella et al. |
| 2011/0308265 A1 | 12/2011 | Phannavong |
| 2012/0023982 A1 | 2/2012 | Berson et al. |
| 2012/0047930 A1 | 3/2012 | Uselton |
| 2012/0102779 A1 | 5/2012 | Beers et al. |
| 2012/0118532 A1 | 5/2012 | Jentzsch et al. |
| 2012/0133176 A1 | 5/2012 | Ramberg |
| 2012/0247135 A1 | 10/2012 | Fakieh |
| 2012/0297805 A1 | 11/2012 | Kamada et al. |
| 2012/0318014 A1 | 12/2012 | Huff et al. |
| 2013/0040549 A1 | 2/2013 | Douglas et al. |
| 2013/0091867 A1 | 4/2013 | Campbell et al. |
| 2013/0145781 A1 | 6/2013 | Liu |
| 2013/0167577 A1 | 7/2013 | Street |
| 2013/0181556 A1 | 7/2013 | Li et al. |
| 2013/0195678 A1 | 8/2013 | Yoo |
| 2013/0298583 A1 | 11/2013 | O'Donnell |
| 2013/0319630 A1 | 12/2013 | Yamamoto |
| 2014/0066572 A1 | 3/2014 | Corveleyn |

(56) References Cited

U.S. PATENT DOCUMENTS

| | | |
|---|---|---|
| 2014/0075970 A1 | 3/2014 | Benson |
| 2014/0075973 A1 | 3/2014 | Graaf et al. |
| 2014/0102679 A1 | 4/2014 | Matsudaira et al. |
| 2014/0223939 A1 | 8/2014 | Nasuta et al. |
| 2014/0241926 A1 | 8/2014 | Fraser |
| 2014/0245770 A1 | 9/2014 | Chen |
| 2014/0260358 A1 | 9/2014 | Leete et al. |
| 2014/0260403 A1 | 9/2014 | Connell |
| 2014/0290299 A1 | 10/2014 | Nakaya |
| 2014/0291411 A1 | 10/2014 | Tamaki et al. |
| 2015/0059367 A1 | 3/2015 | Emo et al. |
| 2015/0064639 A1 | 3/2015 | Drumbreck |
| 2015/0158368 A1 | 6/2015 | Herr-Rathke et al. |
| 2015/0202986 A1 | 7/2015 | Hatakeyama et al. |
| 2015/0210287 A1 | 7/2015 | Penilla et al. |
| 2015/0236525 A1 | 8/2015 | Aridome |
| 2015/0239365 A1 | 8/2015 | Hyde et al. |
| 2015/0306937 A1 | 10/2015 | Kitamura et al. |
| 2015/0330675 A1 | 11/2015 | Tamaki et al. |
| 2016/0089958 A1 | 3/2016 | Powell |
| 2016/0144685 A1 | 5/2016 | Ochiai et al. |
| 2016/0146554 A1 | 5/2016 | Bhatia et al. |
| 2016/0159199 A1 | 6/2016 | Kuroda et al. |
| 2016/0229266 A1 | 8/2016 | Maeda et al. |
| 2017/0067676 A1 | 3/2017 | Munk |
| 2017/0211829 A1 | 7/2017 | Slack et al. |
| 2017/0211855 A1 | 7/2017 | Fraser et al. |
| 2017/0350632 A1 | 12/2017 | Hirao |
| 2018/0001731 A1 | 1/2018 | Vehr |

FOREIGN PATENT DOCUMENTS

| | | |
|---|---|---|
| CN | 201872573 U | 6/2011 |
| CN | 102196931 A | 9/2011 |
| CN | 102398496 A | 4/2012 |
| CN | 103547466 A | 1/2014 |
| CN | 104105610 A | 10/2014 |
| CN | 105071563 A | 11/2015 |
| CN | 105186726 A | 11/2015 |
| CN | 205177980 U | 4/2016 |
| CN | 205194809 U | 4/2016 |
| CN | 105576321 A | 5/2016 |
| CN | 105960345 A | 9/2016 |
| CN | 106103165 A | 11/2016 |
| CN | 106898841 A | 6/2017 |
| DE | 4440044 A1 | 5/1996 |
| DE | 197 45 028 A1 | 4/1999 |
| DE | 10014483 A1 | 11/2000 |
| DE | 199 42 029 A | 3/2001 |
| DE | 199 54 308 A1 | 7/2001 |
| DE | 102005004950 A1 | 8/2006 |
| DE | 10 2007 028851 A1 | 12/2008 |
| DE | 102010054965 A1 | 6/2012 |
| DE | 10 2012 022564 A1 | 5/2014 |
| DE | 11 2015 000552 | 11/2016 |
| EP | 0516413 A1 | 12/1992 |
| EP | 0958952 A1 | 11/1999 |
| EP | 1024038 A2 | 8/2000 |
| EP | 1 400 764 A1 | 3/2004 |
| EP | 1 477 748 A1 | 11/2004 |
| EP | 1 700 725 A1 | 9/2006 |
| EP | 1 703 231 A1 | 9/2006 |
| EP | 1 970 651 A1 | 9/2008 |
| EP | 2048011 A1 | 4/2009 |
| EP | 2196748 A2 | 6/2010 |
| EP | 2320160 A1 | 5/2011 |
| EP | 2620723 A2 | 7/2013 |
| EP | 2894420 A1 | 7/2015 |
| EP | 0963895 A2 | 12/2015 |
| EP | 3118035 A1 | 1/2017 |
| FR | 2966391 A1 | 4/2012 |
| JP | H02-128915 A | 5/1990 |
| JP | 5032121 A | 2/1993 |
| JP | H07186711 A | 7/1995 |
| JP | H97-76740 A | 3/1997 |
| JP | H09318177 A | 12/1997 |
| JP | H10281595 A | 10/1998 |
| JP | 2000108651 A | 4/2000 |
| JP | 2005044551 A | 4/2000 |
| JP | 2002081823 A | 3/2002 |
| JP | 2005-033941 A | 2/2005 |
| JP | 2005-081960 A | 3/2005 |
| JP | 2006-264568 A | 10/2006 |
| JP | 2008220043 A | 9/2008 |
| JP | 2012017029 A | 1/2012 |
| JP | 2014226979 A | 12/2014 |
| KR | 20090068136 A | 6/2009 |
| WO | WO 89/09143 A1 | 10/1989 |
| WO | WO 99/61269 | 12/1999 |
| WO | WO 00/00361 | 1/2000 |
| WO | WO 2004/011288 A1 | 2/2004 |
| WO | WO 2006/082082 A1 | 8/2006 |
| WO | WO 2012/158326 A1 | 11/2012 |
| WO | WO 2013/113308 A1 | 8/2013 |
| WO | WO 2014/112320 A1 | 7/2014 |
| WO | WO 2014/180749 A1 | 11/2014 |
| WO | WO 2014/209780 A1 | 12/2014 |
| WO | WO 2015/076872 A1 | 5/2015 |

OTHER PUBLICATIONS

Anonymous: "NITE Connected Climate Controlled Transport Monitoring/Mobile Internet of Things UI Design/Mobil UI: Progress/Printeres/Internet of Things, User Inter . . . ," Oct. 19, 2016 retrieved from: URL:htps://za.pinterest.com/pin/192810427773981541/, 1 pg.

Bergstrom, Inc., International Search Report and Written Opinion, PCT/US2014/026687, Jul. 28, 2014, 12 pgs.

Bergstrom, Inc., International Preliminary Report on Patentability, PCT/US2014/026687, Sep. 15, 2015, 7 pgs.

Bergstrom, Inc., International Search Report and Written Opinion, PCT/US2014/026683, Jul. 3, 2014 12 pgs.

Bergstrom, Inc., International Preliminary Report on Patentability, PCT/US2014/026683, Sep. 15, 2015, 6 pgs.

Bergstrom, Inc., International Search Report and Written Opinion, PCT/US2013/068331, Nov. 7, 2014, 9 pgs.

Bergstrom, Inc., International Preliminary Report on Patentability, PCT/US2013/068331, May 10, 2016, 6 pgs.

Bergstrom, Inc., International Search Report and Written Opinion, PCT/US2016/021602, Nov. 3, 2016, 7 pgs.

Bergstrom, Inc., International Preliminary Report on Patentability, PCT/US2016/021602, Sep. 12, 2017 , 11 pgs.

Bergstrom, Inc., International Search Report and Written Opinion, PCT/US2017/021346, Jul. 25, 2017, 11 pgs.

Bergstrom, Inc., International Search Report and Written Opinion, PCT/US2016/065812, Mar. 22, 2017, 12 pgs.

Bergstrom, Inc., International Preliminary Report on Patentability, PCT/US2016/065812, Jun. 12, 2018, 8 pgs.

Bergstrom, Inc., International Search Report and Written Opinion, PCT/US2018/044093, Oct. 25, 2018, 13 pgs.

Bergstrom, Inc., International Search Report and Written Opinion, PCT/US2017049859, Nov. 12, 2017, 4 pgs.

Bergstrom, Inc., International Preliminary Report on Patentability, PCT/US2017049859, Mar. 5, 2019, 6 pgs.

Bergstrom, Inc., International Search Report and Written Opinion PCT/US2017053196, Sep. 3, 2018, 17 pgs.

Bergstrom, Inc., International Preliminary Report on Patentability, PCT/US2017053196, Apr. 2, 2019, 11 pgs.

Bergstrom, Inc., International Search Report and Written Opinion PCT/US2016/423326, Sep. 27, 2016, 8 pgs.

Bergstrom, Inc., International Preliminary Report on Patentability PCT/US2016/423326, Jan. 16, 2018, 7 pgs.

Bergstrom, Inc., International Search Report and Written Opinion PCT/US2016/42307, Oct. 7, 2016, 8 pgs.

Bergstrom, Inc., International Preliminary Report on Patentability PCT/US2016/42307, Jan. 16, 2018, 7 pgs.

Bergstrom, Inc., International Search Report and Written Opinion PCT/US2016/42314, Sep. 30, 2016, 7 pgs.

Bergstrom, Inc., International Preliminary Report on Patentability, PCT/US2016/42314, Jan. 16, 2018, 6 pgs.

(56) References Cited

OTHER PUBLICATIONS

Bergstrom, Inc., International Search Report and Written Opinion PCT/US2016/42329, Sep. 30, 2016, 6 pgs.
Bergstrom, Inc., International Preliminary Report on Patentability PCT/US2016/42329, Jan. 16, 2018, 5 pgs.
Bergstrom, Inc., Communication Pursuant to Rules 161(2) and 162 EPC, EP14717604.4, Oct. 23, 2015, 2 pgs.
Bergstrom, Inc., Communication Pursuant to Article 94(3), EP14717604.4, Jun. 2, 2017, 12 pgs.
Bergstrom, Inc., Communication Pursuant to Article 94(3), EP14717604.4, Feb. 4, 2019, 5 pgs.
Bergstrom, Inc., Communication Pursuant to Rules 161(2) and 162 EPC, EP14722438.0, Nov. 2, 2015. 2 pgs.
Bergstrom, Inc. Communication Pursuant to Article 94(3), EP14722438.0, Jan. 24, 2018, 5 pgs.
Bergstrom, Inc., Communication Pursuant to Rules 161(2) and 162 EPC, EP13795064.8, Jun. 22, 2016, 2 pgs.
Bergstrom, Inc. Extended European Search Report, EP16204254.3, Jul. 25, 2017, 8 pgs.
Bergstrom, Inc. Partial European Search Report, EP16204259.2, May 30, 2017, 14 pgs.
Bergstrom, Inc. Extended European Search Report, EP16204259.2, Oct. 25, 2017, 15 pgs.
Bergstrom, Inc. Corrected Extended European Search Report, EP16204259.2, Nov. 24, 2017, 15 pgs.
Bergstrom, Inc. Partial European Search Report, EP16204256.8, Jul. 13, 2017, 14 pgs.
Bergstrom, Inc. Extended European Search Report, EP16204256.8, Jan. 12, 2018, 11 pgs.
Bergstrom, Inc. Extended European Search Report, EP16204256.8, Dec. 1, 2017, 13 pgs.
Bergstrom, Inc. Extended European Search Report, EP16204267.5, Jul. 11, 2017, 8 pgs.
Bergstrom, Inc., Communicaton Pursuant to Article 94(3), EP16820096.2, Aug. 12, 2019, 7 pgs.
Bergstrom, Inc., Communicaton Pursuant to Article 94(3), EP16820096.2, Jan. 18, 2022, 5 pgs.
Bergstrom, Inc. Extended European Search Report, EP18177850.7, Nov. 28, 2018. 8 pgs.
Bergstrom, Inc., Communication Pursuant to Rules 161(1) and 162, EP17780954.8, May 10, 2019, 3 pgs.
Bergstrom, Inc., Communication Pursuant to Article 94(3), EP17780954.8, Jul. 30, 2020, 6 pgs.
Bergstrom, Inc., Extended European Search Report, EP19166779.9, Aug. 30, 2019, 8 pgs.
Bergstrom, Inc., Office Action, CN201480027137.4, 15 pgs.
Bergstrom, Inc., 2nd Office Action, CN201480027137.4, Jul. 13, 2017, 10 pgs.
Bergstrom, Inc., 3rd Office Action, CN201480027137.4, Jan. 17, 2018, 19 pgs.
Bergstrom, Inc., 4th Office Action, CN201480027137.4, Jul. 26, 2018, 8 pgs.
Bergstrom, Inc., Notification of Grant, CN201480027137.4, Feb. 21, 2019, 1 pg.
Bergstrom, Inc., Patent Certificate CN201480027137.4, May 31, 2019, 4 pgs.
Bergstrom, Inc., Office Action, CN201480027117.7, 8 pgs.
Bergstrom, Inc., Patent Certificate, CN201480027117.7, Nov. 21, 2017, 3 pgs.
Bergstrom, Inc., 2nd Office Action, CN201380081940.1, Jan. 17, 2018, 13 pgs.
Bergstrom, Inc., 3rd Office Action, CN201380081940.1, Jul. 30, 2018, 7 pgs.
Bergstrom, Inc., 1st Office Action, CN201680002224.3, Dec. 11, 2018, 5 pgs.
Bergstrom, Inc., Letters Patent, CN201680002224.3, Sep. 10, 2019, 2 pgs.
Bergstrom, Inc., First Office Action, CN201880062566.3, Feb. 9, 2021, 15 pgs.
Bergstrom, Inc., Second Office Action, CN201880062566.3, Oct. 19, 2021, 13 pgs.
Connell, Office Action, U.S. Appl. No. 14/209,877, Nov. 27, 2015, 19 pgs.
Connell, Final Office Action, U.S. Appl. No. 14/209,877, Jun. 22, 2016, 17 pgs.
Connell, Office Action, U.S. Appl. No. 14/209,877, Dec. 29, 2016, 21 pgs.
Connell, Notice of Allowance, U.S. Appl. No. 14/209,877, May 16, 2017, 5 pgs.
Connell, Notice of Allowance, U.S. Appl. No. 14/209,877, Aug. 4, 2017, 7 pgs.
Connell, Office Action, U.S. Appl. No. 14/209,961, Dec. 2, 2015, 14 pgs.
Connell, Final Office Action, U.S. Appl. No. 14/209,961, Jul. 25, 2016, 15 pgs.
Connell, Notice of Allowance, U.S. Appl. No. 14/209,961, Jun. 15, 2017, 10 pgs.
Connell, Notice of Allowance, U.S. Appl. No. 15/064,552, Jun. 1, 2017, 9 pgs.
Connell, Notice of Allowance, U.S. Appl. No. 14/995,119, Aug. 31, 2017, 7 pgs.
Connell, Office Action, U.S. Appl. No. 14/965,142, Aug. 29, 2017, 12 pgs.
Connell, Notice of Allowance, U.S. Appl. No. 14/965,142, Feb. 26, 2018, 8 pgs.
Connell, Office Action, U.S. Appl. No. 15/280,876, Dec. 14, 2017, 23 pgs.
Connell, Notice of Allowance, U.S. Appl. No. 15/280,876, Jun. 21, 2018, 8 pgs.
Connell, Office Action, U.S. Appl. No. 15/791,243, May 8, 2018, 12 pgs.
Connell, Office Action, U.S. Appl. No. 15/065,745, May 31, 2018, 44 pgs.
Connell, Final Office Action, U.S. Appl. No. 15/065,745, Dec. 17, 2018, 27 pgs.
Connell, Office Action, U.S. Appl. No. 15/065,745, May 9, 2019, 28 pgs.
Connell, Notice of Allowance, U.S. Appl. No. 15/065,745, Nov. 14, 2019, 9 pgs.
Connell, Office Action, U.S. Appl. No. 15/283,150, Sep. 27, 2018, 21pgs.
Connell, Notice of Allowance, U.S. Appl. No. 15/283,150, Mar. 22, 2019, 8 pgs.
Connell, Office Action, U.S. Appl. No. 16/894,728, May 26, 2021, 7 pgs.
Connell, Notice of Allowance, U.S. Appl. No. 16/894,728, Sep. 22, 2021, 8 pgs.
Connell, Office Action, Oct. 19, 2018, U.S. Appl. No. 15/722,860, 7 pgs.
Connell, Notice of Allowance, Feb. 7, 2019, U.S. Appl. No. 15/722,860, 5 pgs.
Connell, Notice of Allowance, May 20, 2019, U.S. Appl. No. 15/722,860, 5 pgs.
Connell, Notice of Allowance, U.S. Appl. No. 16/546,141, Dec. 2, 2020, 5 pgs.
Connell, Notice of Allowance, U.S. Appl. No. 15/791,243, Jan. 24, 2019, 7 pgs.
Connell, Notice of Allowance, U.S. Appl. No. 15/791,243, May 15, 2019, 7 pgs.
Connell, Office Action, Apr. 18, 2019, U.S. Appl. No. 15/816,993, 17 pgs.
Connell, Notice of Allowance, Sep. 26, 2019, U.S. Appl. No. 15/816,993, 8 pgs.
Connell, Office Action, U.S. Appl. No. 15/439,865, Sep. 24, 2019, 6 pgs.
Connell, Notice of Allowance, U.S. Appl. No. 15/439,865, Jan. 30, 2020, 8 pgs.
Connell, Office Action, U.S. Appl. No. 15/660,734, Oct. 30, 2019, 24 pgs.
Connell, Notice of Allowance, U.S. Appl. No. 15/660,734, Mar. 9, 2020, 8 pgs.

(56) References Cited

OTHER PUBLICATIONS

Connell, Notice of Allowance, U.S. Appl. No. 16/133,599, Mar. 3, 2020, 9 pgs.
Connell, Office Action, U.S. Appl. No. 16/941,495, Feb. 1, 2022, 12 pgs.
Connell, Office Action, U.S. Appl. No. 17/560,216, Nov. 21, 2022, 10 pgs.
Connell, Office Action, U.S. Appl. No. 18/071,517, Jul. 7, 2023, 18 pgs.
Connell, Notice of Allowance, U.S. Appl. No. 16/941,495, Jul. 5, 2022, 8 pgs.
Connell, Notice of Allowance, U.S. Appl. No. 17/560,216, Mar. 9, 2023, 8 pgs.
Connell, Office Action, U.S. Appl. No. 17/224,052, Feb. 6, 2023, 8 pgs.
Connell, Notice of Allowance, U.S. Appl. No. 17/224,052, Jun. 2, 2023, 5 pgs.
Connell, Notice of Allowance, U.S. Appl. No. 16/922,855, Jun. 20, 2022, 8 pgs.
Connell, Final Office Action, U.S. Appl. No. 18/071,517, Jan. 8, 2024, 17 pgs.
FlatPlate Heat Exchangers; GEA FlatPiate Inc.; website—http://www.flatplate.com/profile.html; date last visited Aug. 9, 2007; 3 pages.
Glacier Bay Inc., Glacier Bay's Home Page, page printed from a website, htt(?: i/web.archive.org/web/19990417062255/htt[2://www.glacierbay.com/, apparent archive date: Apr. 17, 1999, 1 page.
Glacier Bay Inc., Darpa/Glacier Bay ECS, pages printed from a website, httir//web.archive.org/web/19991104132941/wvvw .glacierbay.com/darQatxt. htm, apparent archive date: Nov. 4, 1999, 2 pages.
Glacier Bay Inc., Glacier Bay ECS DARPA Project—Final Report, pages printed from a website, httn://web.archive.or_gjweb/19991103001512/v•vww ,_g.Jacierbay.com/Darnhtm.htm, apparent archive date: Nov. 3, 1999, 9 pages.
Glacier Bay Inc., Glacier Bay ECS DARPA Project—Project Photos, pages printed from a website, httg://web.archive.org/web/1999 "1103012854/www .glacierbay.com/Dargghotos.htm, apparent archive date: Nov. 3, 1999, 2 pages.
Glacier Bay Inc., Glacier Bay ECS DARPA Project—Operational Video, page printed from a website, httQ://web.archive.orq/web/19991022221040/wvvw .glacierbay.com/DarQvid.htm, apparent archive date Oct. 22, 1999; 1 page.
Glacier Bay Inc., R & D, pages printed from a website, htt://web.archive.org/web/20000121130306/www.glacierbay.com/R&D.htm, apparent archive date: Jan. 21, 2000, 2 pages.
Glacier Bay Inc., Company History, pages printed from a website, httg://web.archive.org/web/20000301153828/www .glacierbay.corn/History:.htrn, apparent archive date: Mar. 1, 2000; 2 pages.
Glacier Bay Inc., Contact, page printed from a website, httQ://web.archive.org/web/19990508104511/W\'"I!V .qlacierba:t.com/Contact.htm, apparent archive date: May 8, 1999; 1 page.
Hansson, Office Action Oct. 5, 2018, U.S. Appl. No. 15/256,109, 14pgs.
Hansson, Final Office Action, U.S. Appl. No. 15/256,109, May 2, 2019, 14 pgs.
Hansson, Notice of Allowance, U.S. Appl. No. 15/256,109, Sep. 24, 2019, 9 pgs.
Michael Löhle, Günther Feuerecker and Ulrich Salzer; Non Idling HVAC—modufe tor Long Distance Trucks;SAE TechnicalPaper Series 1999-01-1193; International Congress and Exposition, Detroit, Michigan; Mar. 1-4, 1999; 8 pages.
Mahmoud Ghodbane; On Vehicle Performance of a Secondary Loop A/C System; SAE Technical Paper Series 2000-01-1270; SAE 2000 World Congress, Detroit, Michigan; Mar. 6-9, 2000; 6 pages.
Masami Konaka and Hiroki Matsuo; SAE Technical Paper Series 2000-01-1271; SAE 2000 World Congress, Detroit, Michigan; Mar. 6-9, 2000; 6 pages.
Mayo Mayo, Office Action, U.S. Appl. No. 15/034,517, Feb. 21, 2018, 22 pgs.
Mayo Mayo, Final Office Action, U.S. Appl. No. 15/034,517, Aug. 28, 2018, 9pgs.
Mayo Mayo, Final Office Action, U.S. Appl. No. 15/034,517, Nov. 30, 2018, 7 pgs.
Frank Stodolsky, Linda Gaines, and Anant Vyas; Analysis of Technology Options to Reduce the Fuel Consumption of Idling Trucks; Paper-Center for Transportation Research, Energy Systems Division, Argonne National Laboratory,9700 South Cass Avenue, Argonne, Illinois 60439;Jun. 2000; 30 pages.
Paper No. 26 in IPR2012-00027, Jun. 11, 2013, 12 pgs. (U.S. Pat. No. 7,591,303).
Patricia Gardie and Vincent Goetz; Thermal Energy Storage System by Solid Absorption for Electric Automobile Heating and Air-Conditioning; Paper; 5 pages.
TropiCool No-idle Heating & Cooling, 110V/12V High-efficiency, Self-contained, Electrified Heating/AC System; ACC Climate Control Brochure, Elkhart, Indiana; 205, 1 page.
TropiCool Power Plus, More comfort. More efficiency. More options.; ACC Climate Control Brochure, Elkhart, Indiana; 2006, 3 pages.
Tyco Electronics Corporation, "MAG-MATE Connector with Multispring Pin," Datasheet, 2013, pp. 1-2 from <URL: http://datasheet.octopart.com/1247003-2-TE-Connectivity-datasheet-14918754.pdf>.
Packless Industries, the leader in refrigerant to water coaxial heat exchangers, flexible hoses and sucti . . . ; website—http://www.packless.com/profile.htmle: date last visited Aug. 9, 2007; 1 page.
Xi, Office Action, U.S. Appl. No. 16/370,741, Jun. 29, 2021, 17 pgs.
Xi, Final Office Action, U.S. Appl. No. 16/370,741, Dec. 1, 2021, 7 pgs.
Xi, Notice of Allowance, U.S. Appl. No. 16/370,741, Apr. 18, 2022, 8 pgs.
Xei, Office Action, U.S. Appl. No. 17/894,106, Jun. 23, 2023, 10 pgs.
Xei, Notice of Allowance, U.S. Appl. No. 17/894,106, Nov. 8, 2023, 7 pgs.
Zeigler, Office Action, U.S. Appl. No. 13/661,519, Mar. 11, 2013, 8 pgs.
Zeigler, Final Office Action, U.S. Appl. No. 13/661,519, Sep. 18, 2013, 15 pgs.
Zeigler, Office Action, U.S. Appl. No. 13/661,519, Apr. 9, 2014, 20 pgs.
Zeigler, Final Office Action, U.S. Appl. No. 13/661,519, Sep. 26, 2014, 23 pgs.
Zeigler, Office Action, U.S. Appl. No. 13/661,519, Oct. 28, 2015, 20 pgs.
Zeigler, Notice of Allowance, U.S. Appl. No. 13/661,519, Jun. 17, 2016, 8 pgs.
Zeigler, Office Action, U.S. Appl. No. 16/046,711, Feb. 6, 2020, 17 pgs.
Zeigler, Final Office Action, U.S. Appl. No. 16/046,711, Jul. 23, 2020, 17 pgs.
Zeigler, Advisory Action, U.S. Appl. No. 16/046,711, Oct. 27, 2020, 5 pgs.
Zeigler, Office Action, U.S. Appl. No. 16/046,711, Aug. 31, 2021, 16 pgs.
Zeigler, Office Action, U.S. Appl. No. 17/948,999, May 1, 2023, 24 pgs.
Zeigler, Notice of Allowance, U.S. Appl. No. 17/948,999, Dec. 22, 2023, 6 pgs.
Bergstrom, Inc., Communication Pursuant to Article 94(3), EP13795064.8, Oct. 8, 2018, 5 pgs.
Bergstrom, Inc., Communication Pursuant to Article 94(3), EP18177850.7, Jan. 30, 2023, 4 pgs.
Bergstrom, Inc., Communication Pursuant to Article 94(3), EP17780954.8, Mar. 27, 2024, 8 pgs.
Bergstrom, Inc., Communication Pursuant to Article 94(3), EP17768567.4, Jul. 14, 2022, 5 pgs.
Beygel, Notice of Allowance, U.S. Appl. No. 17/972,932, Jul. 31, 2024, 9 pgs.
Connell, Office Action, U.S. Appl. No. 18/071,517, Aug. 26, 2024, 16 pgs.
Connell, Office Action, U.S. Appl. No. 18/324,090, Mar. 13, 2024, 11 pgs.

(56) References Cited

OTHER PUBLICATIONS

Zeigler, Notice of Allowance, U.S. Appl. No. 17/948,999, Apr. 25, 2024, 5 pgs.

* cited by examiner

SYSTEMS AND METHODS OF MANAGING A POWER SOURCE OF A VEHICLE

RELATED APPLICATIONS

This application is a continuation of U.S. patent application Ser. No. 17/224,052, filed Apr. 6, 2021, which is a continuation of U.S. patent application Ser. No. 16/546,141, filed Aug. 20, 2019, now U.S. Pat. No. 10,967,709, which is a continuation of U.S. patent application Ser. No. 15/722,860, filed Oct. 2, 2017, now U.S. Pat. No. 10,427,496, which is a continuation of U.S. patent application Ser. No. 15/064,552, filed Mar. 8, 2016, now U.S. Pat. No. 9,783,024, which claims priority to U.S. Provisional Patent Application No. 62/130,399, filed Mar. 9, 2015, each of which is herein incorporated by reference in its entirety.

TECHNICAL FIELD

The disclosed implementations relate generally to Heating, Ventilation, and Air Conditioning (HVAC) climate control systems for a fleet of vehicles. In particular, the disclosed implementations relate to systems and methods for remotely controlling climate control systems of a fleet of vehicles.

BACKGROUND

Climate control systems, such as Heating, Ventilation, and Air Conditioning (HVAC) systems are generally installed in vehicles (e.g., trucks) to maintain perishable goods at a desirable temperature, or to maintain the internal temperature for the vehicle occupants. The climate control systems may include mechanically driven compressor(s) and/or electrically driven compressor(s). The mechanically driven compressor(s) are typically powered by the vehicle engine when the vehicle engine is in operation. The electrical compressor(s) are typically powered by an auxiliary power source such as a battery pack. Thus, power can be supplied to the electrical compressor(s) even when the vehicle is off and in a "no idle state." Because such climate control systems require power to be provided when the engine is off and in a "no idle state," the auxiliary power source may be easily drained. Continuous use of the power from the auxiliary power source under these conditions may lead to excessive draining of the auxiliary power source, resulting in insufficient power to operate the HVAC system or in some instances even start the vehicle.

As a result, it is desirable to operate climate control systems efficiently to extend the capacity of the auxiliary power source(s) of the vehicle. One way to extend the capacity of the auxiliary power source(s) is by locally controlling the operational settings of the climate control system. The success of such a climate control system, however, is user dependent. For example, a driver of the vehicle may independently decide to operate the vehicle HVAC system inefficiently when the control of the climate control system is locally accessible. Moreover, HVAC systems are typically controlled for one vehicle at a time. Such systems fail to provide fleet operators with overall control of energy use of their fleet of vehicles. As such it would be desirable to provide a system that addresses these shortcomings.

SUMMARY

The following provides a description of systems and methods that allow for remote climate control system (HVAC) management of a fleet of vehicles from a central management system by monitoring a broad range of specific parameters affecting functions of the climate control systems and controlling the climate control systems accordingly. Remotely managing a wide range of parameters for a fleet of vehicles provides a reliable method of identifying vehicles having potential climate control system performance inefficiencies based on a comparison of parameters measured and reported in real time with those from similarly situated vehicles operating efficiently. Furthermore, some implementations of the present invention allow for analysis and comparison of historical parameter data gathered over time for all vehicles in the fleet. Moreover, some implementations provide visual indicators signaling a degree of energy conservation or depletion based on performance efficiency or inefficiency of the climate control system of each vehicle to quickly identify and correct the inefficiencies.

Some implementations provide a method for simultaneously managing climate control systems of a fleet of vehicles. In some implementations, the method is implemented at a fleet server system that is remote from a fleet of vehicles having one or more processors and memory for storing one or more programs for execution by the one or more processors. The method includes receiving, from each vehicle of the fleet of vehicles, at least one parameter relaying information about a performance of a climate control system of the respective vehicle. Each climate control system includes an electrically driven compressor. The method also includes determining whether at least one performance inefficiency exists for the climate control system of at least one vehicle of the fleet of vehicles based on the at least one parameter received from the at least one vehicle. Further, the method includes determining an efficient operational setting that reduces the performance inefficiency of the climate control system of the at least one vehicle of the fleet of vehicles. Determining the efficient operational setting occurs when it is determined that performance inefficiency exists for the climate control system of the at least one vehicle. Furthermore, the method includes transmitting an operational setting instruction to the at least one vehicle to control the climate control system of the at least one vehicle.

Some implementations provide a method for displaying energy parameters or characteristics of a vehicle climate control system of at least one vehicle having a controller coupled to an electrically driven compressor that is powered by an auxiliary power source. This method includes receiving, at the controller, from a server remote from the at least one vehicle, at least one graphics instruction relating to a state of the at least one vehicle's auxiliary power source. In some implementations, the method further includes displaying a parameter associated with the climate control system of the at least one vehicle on a graphical user interface (GUI). In addition, a ring surrounding the parameter is displayed on the graphical user interface. The ring represents the state of the auxiliary power source and changes color, intensity, or size based on a degree of energy efficiency of the climate control system of the at least one vehicle.

Some implementations provide a system for simultaneously managing climate control systems of at least one vehicle of a fleet of vehicles. In some implementations, the system is remote from the fleet of vehicles and includes a receiver and a transmitter coupled to one or more processors, a memory coupled to the one or more processors in which the memory stores programs configured to be executed by the one or more processors, in which the one or more programs include instructions for receiving, from each vehicle of the fleet of vehicles, at least one parameter relaying information about a performance of a climate control system of the respective vehicle. Each climate control system includes an electrically driven compressor. The one or more programs also include instructions for determining whether a performance inefficiency exists for the climate control system of at least one vehicle of the fleet of vehicles based on the at least one parameter received from the at least one vehicle. Further, the one or more programs include instructions for determining an efficient operational setting that reduces the performance inefficiency of the climate control system of the at least one vehicle of the fleet of vehicles. Determining the efficient operational setting occurs when it is determined that performance inefficiency exists for the climate control system of the at least one vehicle. Furthermore, the one or more programs include instructions for transmitting an operational setting instruction to the at least one vehicle to control the climate control system of the at least one vehicle.

Some implementations provide a method for displaying energy parameters or characteristics of a climate control system of at least one vehicle of a fleet of vehicles. In some implementations, the method is implemented at a server system remote from a fleet of vehicles in which the server system includes a receiver and a transmitter coupled to one or more processors and a memory coupled to the one or more processors. The memory stores programs configured to be executed by the one or more processors. The one or more programs include instructions for receiving, from a controller coupled to an electrically driven compressor of the climate control system, information relating to a state of an auxiliary power source powering the electrically driven compressor. The one or more programs also include instructions for determining the degree of energy efficiency and a remaining runtime based on the state of the auxiliary power source. Further, the one or more programs include instructions for generating a graphics instruction based on the state of the auxiliary power source and for transmitting the graphics instruction to be displayed on a graphical user interface (GUI). For example, a parameter associated with the climate control system of the at least one vehicle is displayed on the graphical user interface. In addition, a ring surrounding the parameter is displayed on the graphical user interface. The ring represents the state of the auxiliary power source and changes color, intensity, or size based on a degree of energy efficiency of the climate control system of the at least one vehicle.

The systems and methods of the present invention(s) provide(s) advantages of having a central server simultaneously monitoring and controlling the climate control systems of a fleet of vehicles as this allows system wide limitations to be set for the fleet, to reliably identify and correct any outlier vehicles within the fleet (sometimes using operational settings of similarly situated vehicles in the fleet to correct the outlier vehicle operational settings), and to ensure the systems are performing as consistently and as efficiently as possible. The fleet operator or the user (i.e. the driver) in this case is also able to detect issues with any outliers before actual failure of any HVAC parts thereby reducing potential repair/replacement costs.

Performance inefficiencies can be identified and corrected through the central fleet server sending out a control signal with instructions in real time either to the vehicle to control the operational settings of the climate control system to the more efficient settings, or to a "smart" mobile device of a fleet operator to remotely change the settings based on some visual instruction generated on the mobile device as a result of the control instruction. For example, the fleet operator can execute unique commands in response to the control signal from the central server, including, but not limited to limiting a temperature set by the user of the vehicle, or lowering blower speed of a condenser fan, and the like. Furthermore, by virtue of controlling a fleet versus an individual vehicle, the fleet operator can monitor in real time fuel saved and other efficiency data of the entire fleet to easily compare this to company goals and make adjustments in real time in a continuous effort to achieve company goals.

BRIEF DESCRIPTION OF THE DRAWINGS

The implementations disclosed herein are illustrated by way of example, and not by way of limitation, in the figures of the accompanying drawings. Like reference numerals refer to corresponding parts throughout the drawings.

DETAILED DESCRIPTION

Figure 1:
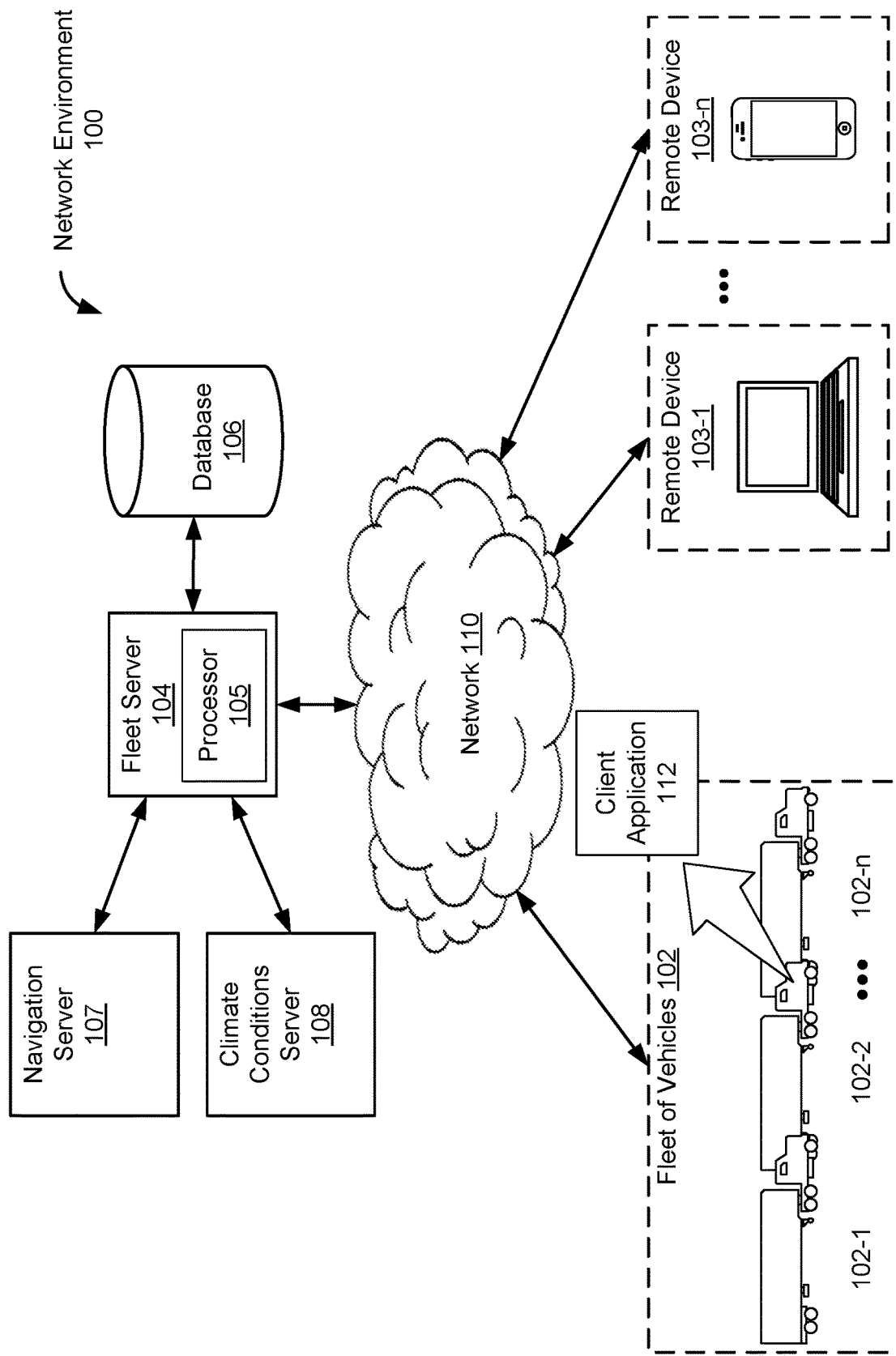
FIG. 1 is a block diagram illustrating a client-server environment, in accordance with some implementations.

Attention is now directed to the figures, and in particular to FIG. 1, which is a block diagram of a network environment 100, according to some implementations, in which a climate control system of one or more vehicles are controlled remotely by a fleet server. The network environment 100 includes a fleet of vehicles 102-1 . . . 102-n, a fleet server 104 including at least one processor 105, and remote devices 103-1 . . . 103-n (e.g., a desktop computer, a laptop computer, smart phones, etc.), all connected through a network 110.

In some implementations, the remote device 103-1 communicates with one or both of the fleet server 104 and the vehicle 102-1. The remote device 103-1 and the functions and methods that it performs are discussed herein. Any description(s) of the remote device 103-1, or of the functions or methods performed by the remote device 103-1, apply equally to any or all instances of the remote devices 103-1 . . . 103-n. Exemplary remote devices include a desktop computer, a laptop computer, a tablet computer, a mobile electronic device, a server computer (or server computer system), a mobile phone, a digital media player, or any other appropriate electronic device. Exemplary devices include vehicles that contain such devices including cars, airplanes, trains and the like.

In some implementations, the fleet server 104 includes at least one processor 105, and is any of: a desktop computer, a laptop computer, a tablet computer, a server computer (or server system), a mobile electronic device, a mobile phone, a digital media player, or any other appropriate electronic device.

The network 110, and the functions and methods performed within the network environment, are discussed herein. Any description(s) of the vehicle 102-1, or of the functions or methods performed by the vehicle 102-1, apply equally to any or all instances of the vehicles 102-1 . . . 102-n. Exemplary vehicles include a truck, a lorry, a van, a train, a car or any other appropriate vehicle. Each vehicle includes the hardware and software described in relation to the figure below.

The network 110 includes any of a variety of networks, including a wide area network (WAN), local area networks (LAN), Personal Area Networks, metropolitan area networks, VPNs, local peer-to-peer, ad-hoc connections, wireless networks, wired networks, the Internet, or a combination of such networks.

The vehicle 102-1 is operated by a user (e.g., a driver). The user of the vehicle can control some aspects of the climate control system for his/her vehicle locally at the vehicle. In some implementations, the vehicle 102-1 includes a client application 112 that facilitates the transmission of one or more parameters to other devices, such as the fleet server 104 and/or remote devices 103-1 . . . 103-n. In some implementations, the client application 112 also facilitates receipt of information (e.g., operational settings of the climate control system and/or other instructions/alerts) from other devices, such as the fleet server 104 and/or remote devices 103-1 . . . 103-n or other servers including, but not limited to navigation server 107 and climate/weather condition server 108. In some implementations, the parameters transmitted from the vehicle 102-1 to other devices includes information associated with the operational settings of the vehicle 102-1 (e.g., ambient temperature, location coordinates, location information, oil pressure, tire pressures, battery voltage, engine calibration, and the number of diagnostic trouble codes, etc.). In some implementations, the parameters transmitted from the vehicle 102-1 to other devices includes information received by the vehicle 102-1 from other devices and/or peripherals, such as the navigation server 107, climate/weather conditions server 108, other vehicles, etc.

In some implementations, the vehicle 102-1 can also share the parameters from the vehicle 102-1 to other vehicles and/or entities, and/or share parameters between third-parties. For example, a user may be prompted, via a user interface of the vehicle 102-1 or the user's connected smart phone, to approve or deny a request for one third-party to share that user's parameters or operational settings with a third-party.

In some implementations, a desired operational setting of the climate control system of the vehicle 102-1 is determined based on measured or determined parameters or other related indications, such as time of day, device or application usage, location (e.g., from the navigation server 107 or otherwise), ambient light, ambient temperature, infrared energy emitted (e.g., from a thermal imaging device), connected devices/accessories, and the like. In some implementations, other devices in addition to, or instead of, the vehicle 102-1, remotely control or facilitate control of the operational settings of the climate control system of the vehicle 102-1. For example, the fleet server 104 communicates with the vehicle 102-1, through processor 105, to control the operational settings of the vehicle 102-1. As another example, peripheral devices (e.g., navigation server 107, climate/weather condition server 108, other vehicles 102-2 . . . 102-n, remote devices 103-1 . . . 103-n) provide signals to the vehicle 102-1 and/or the fleet server 104. These signals may be parameters or support information for determining desired operational settings, and can be used, alone or in combination with other signals (e.g., parameters from the vehicle 102-1), to determine desired operational settings for the climate control system of the vehicle 102-1.

In some implementations, the remote device 103-1 is associated with an entity that receives, stores, uses, or otherwise accesses information associated with the operational settings of the fleet of vehicles 102-1 . . . 102-n. For example, the remote device may be a laptop or a cell phone of an interested third party, such as an operator of the fleet of vehicles (fleet operator).

Figure 2:
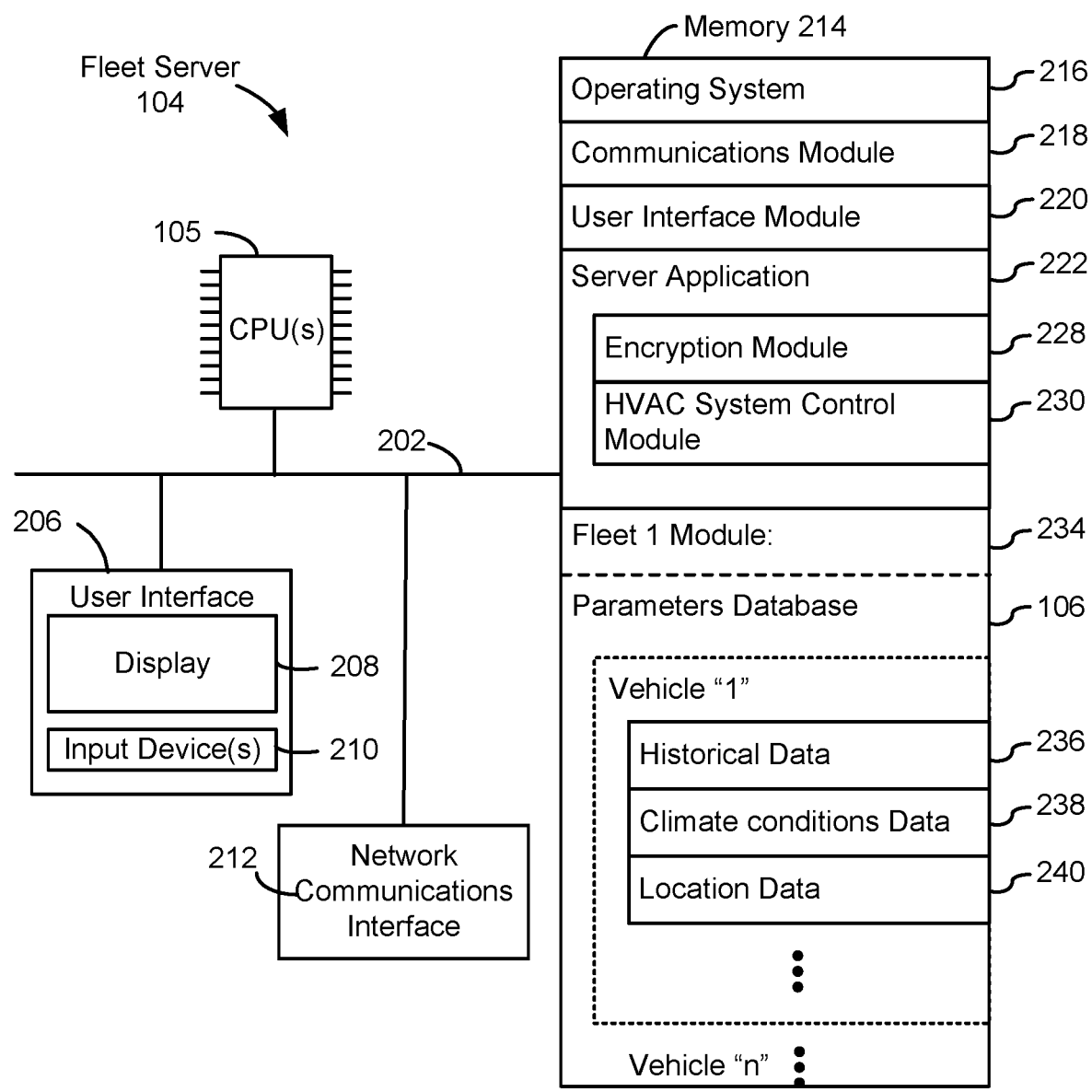
FIG. 2 is a block diagram illustrating a fleet server, in accordance with some implementations.

FIG. 2 is a block diagram illustrating a fleet server 104, in accordance with some implementations.

In some implementations, the fleet server 104 is configured to communicate, via the network 110 and/or other communication means, with multiple, i.e., a fleet of vehicles 102-1 . . . 102-n and multiple remote devices 103-1 . . . 103-n to provide information associated with the operational settings of the climate control systems of the fleet of vehicles (e.g., 102-n). In some implementations, the fleet server 104 includes and/or communicates with a database 106. As described herein, the database 106 stores information associated with the operational settings of the fleet of vehicles.

The fleet server 104 typically includes one or more processors or CPUs 105, a user interface 206, at least one network communications interface 212 (wired and/or wireless), memory 214, and at least one communication bus 202 for interconnecting these components. Each communication bus 202 includes circuitry (sometimes called a chipset) that interconnects and controls communications between system components. In some implementations, the user interface 206 includes a display 208 and input device(s) 210 (e.g., keyboard, mouse, touchscreen, keypads, etc.).

Memory 214 includes high-speed random access memory, such as DRAM, SRAM, DDR RAM, or other random access solid state memory devices, and may include non-volatile memory, such as one or more magnetic disk storage devices, optical disk storage devices, flash memory devices, or other non-volatile solid state storage devices. Memory 214 may optionally include one or more storage devices remotely located from the CPU(s) 204. Memory 214, or alternately the non-volatile memory device(s) within memory 214, includes a non-transitory computer readable storage medium. In some implementations, memory 214 or the computer readable storage medium of memory 214 stores the following programs, modules and data structures, or a subset thereof:

- an operating system 216 that includes procedures for handling various basic system services and for performing hardware dependent tasks, including but not limited to:
  - receiving requests for climate control system operational settings and/or communications directed to the fleet of vehicles 102-1 . . . 102-*n* from third parties, e.g. fleet operators, for receiving responses from vehicles 102-*n*, and for forwarding communications from third parties to client devices and vice versa, based on each vehicle's climate control system and associated parameters;
  - receiving information from remote devices 103-1 . . . 103-*n*, including but not limited to: instructions to change an operational setting of an inefficient climate control system, and instructions to block a user from changing operational settings of the climate control system;
- a communication module 218 that is used for connecting the fleet server 104 to other computers via the one or more network interfaces 212 (wired or wireless) and one or more communication networks, such as the Internet, other Wide Area Networks, Local Area Networks, Personal Area Networks, Metropolitan Area Networks, VPNs, local peer-to-peer and/or ad-hoc connections, and so on, receives requests for climate control system operational settings and/or communications directed to the fleet of vehicles 102-1 . . . 102-*n* from third parties, e.g. fleet operators, receives responses from vehicles 102-*n*, forwards communications from third parties to client devices and vice versa, based on each vehicle's climate control system and associated parameters, receives information from remote devices 103-1 . . . 103-*n*, including but not limited to instructions to change an operational setting of an inefficient climate control system, and instructions to block a user from changing operational settings of the climate control system;
- a user interface module 220 that receives commands and/or inputs from a user via the user interface 206 (e.g., from the input device(s) 210, which may include keyboard(s), touch screen(s), microphone(s), pointing device(s), and the like), and provides user interface objects on a display (e.g., the display 208);
- one or more server application module(s) 222 for enabling the server 104 to perform the methods and/or techniques described herein, the server application module(s) 222 including but not limited to:
  - an optional encryption module 228 for encrypting individual vehicle and/or fleet information for secure storage, if the vehicle and/or fleet information was not encrypted before it was received by the fleet server 104;
  - an HVAC system control module 230 for managing information/data relating to climate control system performance efficiencies and inefficiencies based on current settings and other parameters;
  - a fleet 1 module 234 for managing information/data relating to all vehicles in a fleet 1 of vehicles, i.e., vehicles 102-1 . . . 102-*n*;
  - a parameters database 106 that includes information relating to measured and stored parameters associated with each vehicle of the fleet of vehicles;
  - historical data 236 received from each vehicle, including historical climate control system data;
  - climate conditions data 238 including climate data for present time and predicted future weather conditions; and
  - location data 240 including location data of vehicle, including past, current and intended route information.

Figure 3:
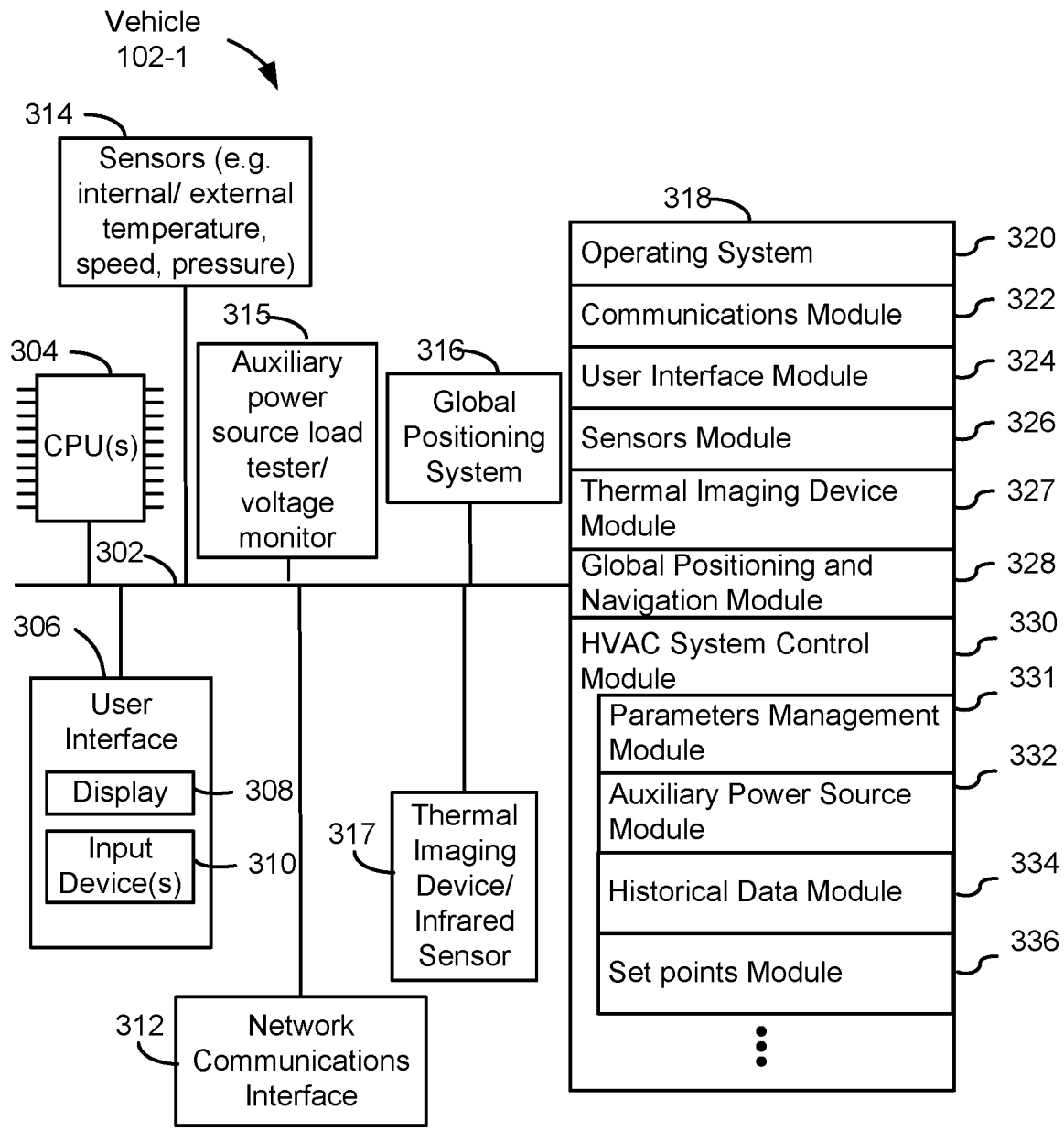
FIG. 3 is a block diagram illustrating a computing system of at least one vehicle of the fleet of vehicles, in accordance with some implementations.

FIG. 3 is a block diagram illustrating a computing system of at least one vehicle of the fleet of vehicles, in accordance with some implementations. While FIG. 3 illustrates one instance of a vehicle of the fleet of vehicle (i.e., vehicle 102-1), the figure and associated description applies equally to any one or more vehicles in the fleet (e.g., 102-1-102-*n*).

In some implementations, the vehicle 102-1 is any of a truck, a lorry, a van, a train, a car or any other appropriate vehicle.

The vehicle 102-1 typically includes a computing device including one or more controllers, processors or CPUs 304, a user interface 306, at least one network communications interface 312 (wired and/or wireless), one or more sensors 314, an auxiliary power source load tester/monitor 315, a global positioning system 316, a thermal imaging device 317, memory 318, and at least one communication bus 302 for interconnecting these components. Each communication bus 302 typically includes circuitry (sometimes called a chipset) that interconnects and controls communications between system components. In some implementations, the user interface 306 includes a display 308 and input device(s) 310 (e.g., keyboard, mouse, touchscreen, keypads, etc.).

The sensors 314 are any devices capable of measuring internal, external, ambient temperatures relative to the cab of the vehicle, fan speeds of the climate control system of the vehicle, internal and external pressures relative to the cab of the vehicle, and the like.

The auxiliary power source load tester/monitor 315 is any device capable of measuring and/or monitoring a voltage, current, and/or power of an auxiliary power source used to power the climate control (e.g. HVAC) system of the at least one vehicle 102-1, e.g. solar power, a waste heat recovery (WHR) system, or a battery pack driving a compressor of the climate control (HVAC) system.

The global positioning system 316 includes devices and/or components for determining the location of the vehicle 102-1, including but not limited to global positioning system (GPS) sensors, radio receivers (e.g., for cell-tower triangulation, WiFi-based positioning, etc.), inertial sensors, and accelerometers. In some implementations, the client device 102-1 does not include (or does not rely on) a separate positioning system 316. For example, where the vehicle 102-1 is connected to the Internet (e.g., via the network communications interface 212), the location of the vehicle 102-1 can be determined using IP address geolocation techniques. Other techniques for determining the location of the vehicle 102-1, including those that rely on a built-in or connected positioning system and those that do not, are also contemplated. In some implementations, location is determined by the network being connected to (e.g., in an airplane, train, building or cell phone tower) other sensor information which might identify location.

The thermal imaging device and infrared sensor 317 includes devices and/or components for capturing infrared radiation emitted from objects. In some implementations, the thermal imaging device detects infrared radiation emitted and is capable of identifying warmer zones of a vehicle where a person is located.

Memory 318 includes high-speed random access memory, such as DRAM, SRAM, DDR RAM, or other random access solid state memory devices, and may include non-volatile memory, such as one or more magnetic disk storage devices, optical disk storage devices, flash memory devices, or other non-volatile solid state storage devices. Memory 318 may optionally include one or more storage devices remotely located from the CPU(s) 304 (e.g., a network-connected storage device or service, such as a "cloud" based storage service). Memory 318, or alternately the non-volatile memory device(s) within memory 318, includes a non-transitory computer readable storage medium. In some implementations, memory 218 or the computer readable storage medium of memory 218 stores the following programs, modules and data structures, or a subset thereof:

- an operating system 320 that includes procedures for handling various basic system services and for performing hardware dependent tasks;
- a communications module 322 that is used for connecting the vehicle 102-1 to other computers via the one or more network communication interfaces 312 (wired or wireless) and one or more communication networks, such as the Internet, other Wide Area Networks, Local Area Networks, Personal Area Networks, Metropolitan Area Networks, VPNs, local peer-to-peer and/or ad-hoc connections, and so on;
- a user interface module 324 that receives commands and/or inputs from a user via the user interface 306 (e.g., from the input device(s) 310, which may include keyboard(s), touch screen(s), microphone(s), pointing device(s), and the like), and provides user interface objects on a display (e.g., the display 308);
- a sensors module 326 that works in conjunction with the sensor devices 314 (including but not limited to, for example, internal and external temperature sensors for measuring temperature relative to the vehicle, A/C system operating pressure and temperature sensors, fan speed sensors (e.g. to measure condenser fan speed);
- a thermal imaging device/infrared sensor module 327 that works in conjunction with the thermal imaging device and infrared sensor 317 for capturing infrared energy emitted from occupants of the vehicle;
- a global positioning and navigation module 328 that, in conjunction with the global positioning system 316, determines a current location (e.g., latitude and longitude, street address, city, state, municipality, etc. . . . ) and a route of the vehicle 102-1;
- one or more HVAC system control module(s) 330 for enabling the fleet server 104 to control the HVAC by performing the methods and/or techniques described herein, the HVAC system control module(s) 330 including but not limited to:
  - a parameters management module 331 for managing and transmitting parameters relating to performance of the climate control system of at least one vehicle and/or external parameters affecting the performance of the climate control system(s)
  - an auxiliary power source module 332 that works in conjunction with the auxiliary power source load tester/monitor 315 to monitor fluctuations in voltage and determine available power of the auxiliary power source.
  - a historical data module 334 for managing historical climate control system data.
  - a set points data module 336 for managing past and current set point parameters (e.g. temperatures) set by the user.

In some implementations, the client vehicle 102-1 includes a subset of the components and modules shown in FIG. 3. Moreover, in some implementations, the client device 102-1 includes additional components and/or modules not shown in FIG. 3.

In some implementations, any or all of the communications between devices described with respect to the figures, are secured and/or encrypted using any appropriate security and/or encryption techniques, including but not limited to Hypertext Transport Protocol Secure (HTTPS), Secure Sockets Layer (SSL), Transport Layer Security (TLS), Secure Shell (SSH), Internet Protocol Security (IPSec), public key encryption, and the like (including any appropriate yet to be developed security and/or encryption method).

In some implementations, the method for remotely managing climate control systems of at least one vehicle of a fleet of vehicles are implemented at the fleet server that is remote from the at least one vehicle. In some implementations, each climate control system includes an electrically driven compressor driven by an auxiliary power source, such as an auxiliary battery pack separate from the vehicle's regular battery.

Figure 4:
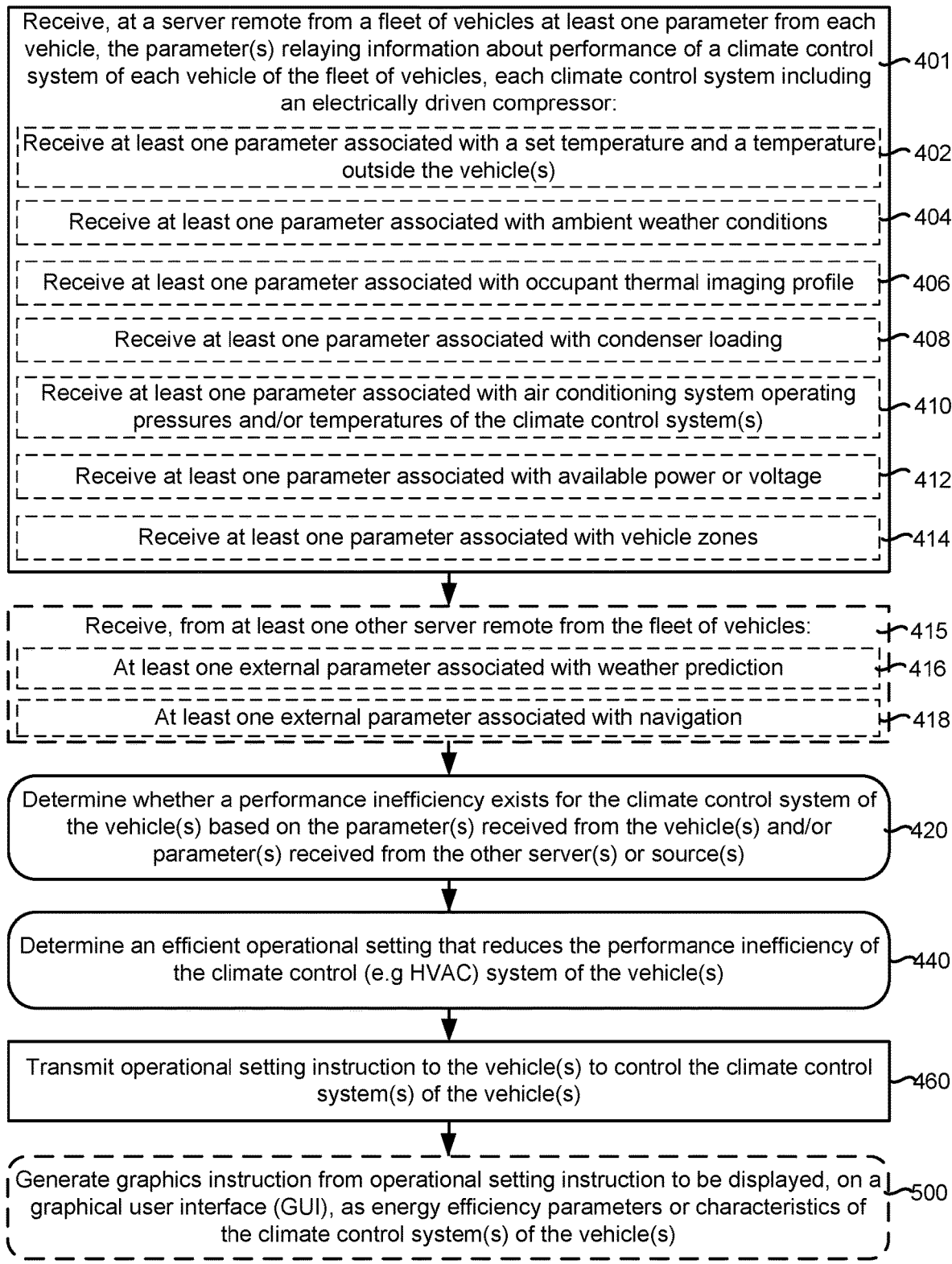
FIG. 4 is a flow diagram illustrating an exemplary method for remotely managing a climate control system of at least one vehicle of a fleet of vehicles, in accordance with some implementations.

FIG. 4 is a flow diagram illustrating an exemplary method for remotely managing a climate control system of at least one vehicle of a fleet of vehicles, in accordance with some implementations.

In some implementations, as illustrated in FIG. 4, at step 401, the fleet server 104 may receive at least one parameter from the at least one vehicle 102-1 of the fleet of vehicles 102-1 . . . 102-n. The at least one parameter relays information about a performance of a climate control system of the at least one vehicle 102-1 of the fleet of vehicles 102-1 . . . 102-n. For example, the at least one parameter is typically associated with a temperature, $T_{SP}$, set by a user, ambient temperature in the vehicle, $T_I$, or outside temperature surrounding the vehicle, $T_O$. For example, the user is typically a driver of the vehicle who may set the desired temperature $T_{SP}$ for the HVAC system to heat or cool air within an interior of the vehicle. Temperatures $T_O$ and $T_I$ are periodically acquired by the temperature sensor 314 and transmitted to the server 104 for processing by the processor/CPU 105 of the fleet server 104 and/or for storage in the database 106 of the memory 214 associated with the fleet server 104.

In some implementations, the method for remotely managing climate control systems of the at least one vehicle of a fleet of vehicles includes determining, by the processor 105, whether performance inefficiencies exist for the climate control system of the at least one vehicle of the fleet of vehicles, as shown in step 420. The determination is based on at least one parameter received from the at least one vehicle 102-1 and/or at least one external parameter received from at least one other server 107, 108.

In some implementations, as illustrated in FIG. 1, the fleet server 104 may determine a desirable/efficient operational setting based on the parameter(s) received from the at least one vehicle, as shown in step 440. The determination is based on a real time analysis of the parameter(s) received from the vehicle(s). In some implementations, the processor 105 of the fleet server 104 compares the parameter(s) received from the vehicle(s) 102-1, relating to specific settings, such as a temperature set by the user $T_{SP}$, ambient temperature inside the vehicle $T_I$ and temperature outside of the vehicle $T_O$. For example, $T_{SP}$, $T_I$ and/or $T_O$ are compared to one or more predetermined reference parameters identified by the processor 105 to determine desirable operational settings. The desirable operational settings are determined to reduce or eliminate performance inefficiencies in the climate control system(s) of at least one of the vehicles.

In other implementations, the processor 105 compares the parameter(s) received from the vehicle(s), e.g. $T_I$ and $T_{SP}$, to parameter(s) of a similarly situated vehicle. In some implementations, the parameters of the similarly situated vehicle indicate an efficiently operating climate control system and are therefore used as reference parameters for determining desirable operational settings of other climate control systems of other vehicles. A similarly situated vehicle is typically one that is subject to similar conditions as another vehicle. For example, similarly situated vehicles of the fleet of vehicles may operate under same or similar conditions, such as same or similar temperatures, travelling route, location, weather conditions, terrain and/or traffic conditions. For example, received parameters corresponding to a reference vehicle with a climate control system with desirable operational setting may set the current operational settings for vehicles subjected to similar conditions (e.g., weather conditions).

Accordingly, the fleet server 104 determines desirable operational setting(s) i.e., efficient settings for the parameter(s) received from the vehicle(s).

In some implementations, the fleet server 104 transmits instructions of the desirable operational setting(s) (e.g., temperature settings) to the one or more vehicles to inform the user of the vehicle(s) of the desirable operational setting(s) (e.g., efficient operation settings), as shown by step 460. That is, the operational settings of the climate control system of the at least one vehicle can be controlled to improve the duration of operation of the auxiliary power supply for supporting the climate control system, especially when the vehicle's engine is turned off.

The received parameter(s) and the operational settings determined or selected based on the received parameter(s) are stored in the memory 214 of the fleet server 104 for future use. The stored parameters and corresponding operational settings may be used as reference values for determining efficient operational settings for other vehicles having an inefficiently operating climate control system.

In some implementations, the fleet server 104 receives other parameters from other devices independent of the fleet of vehicles. For example, the fleet server receives external parameters from the navigation server 107 and the climate conditions server 108. The external parameters may include traffic conditions and/or weather condition parameters along a route of the vehicle(s). The processor 105 of the fleet server 104 determines the desirable operational settings of the at least one vehicle based on the external parameters along with the parameters received from the at least one vehicle. For example, the climate conditions server 108 provides parameters relating to climate conditions along the route of the vehicle. The processor 105 of the fleet server 104 processes the parameters and determines the desirable operational settings of the at least one vehicle 102-1 in order to account for changes in weather conditions along the route. In this way, the fleet server 104 modifies the settings of the climate control system in order to ensure maximum life of the auxiliary power source.

For example, an outside temperature (98° F.) may be received from a climate conditions server 108 instead of the vehicle 102-1 while the set point temperature (65° F.) is received from the vehicle. In this case, the desirable operational setting is determined for set point temperature when the outside temperature is 98° F. The determination of the desirable, i.e., efficient operational settings when a performance inefficiency exists is based on the external parameters and the parameters received from the vehicle. As noted, the reference parameters are stored in database or the memory 212 of the fleet server 104.

Figure 5A:
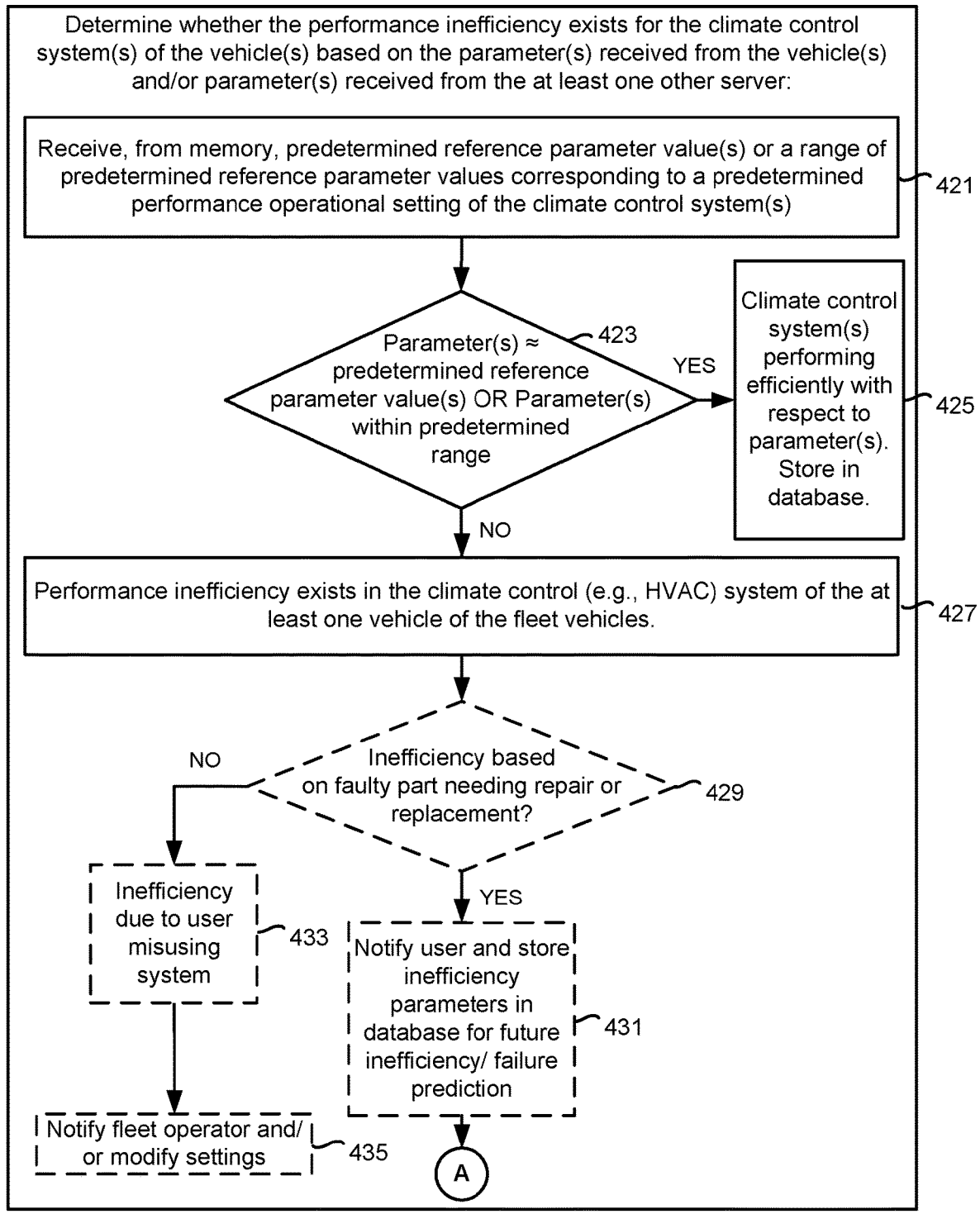
FIGS. 5A and 5B are flow diagrams illustrating exemplary methods for determining whether a performance inefficiency exists for the climate control system of the at least one vehicle of the fleet of vehicles in accordance with some implementations.
Figure 5B:
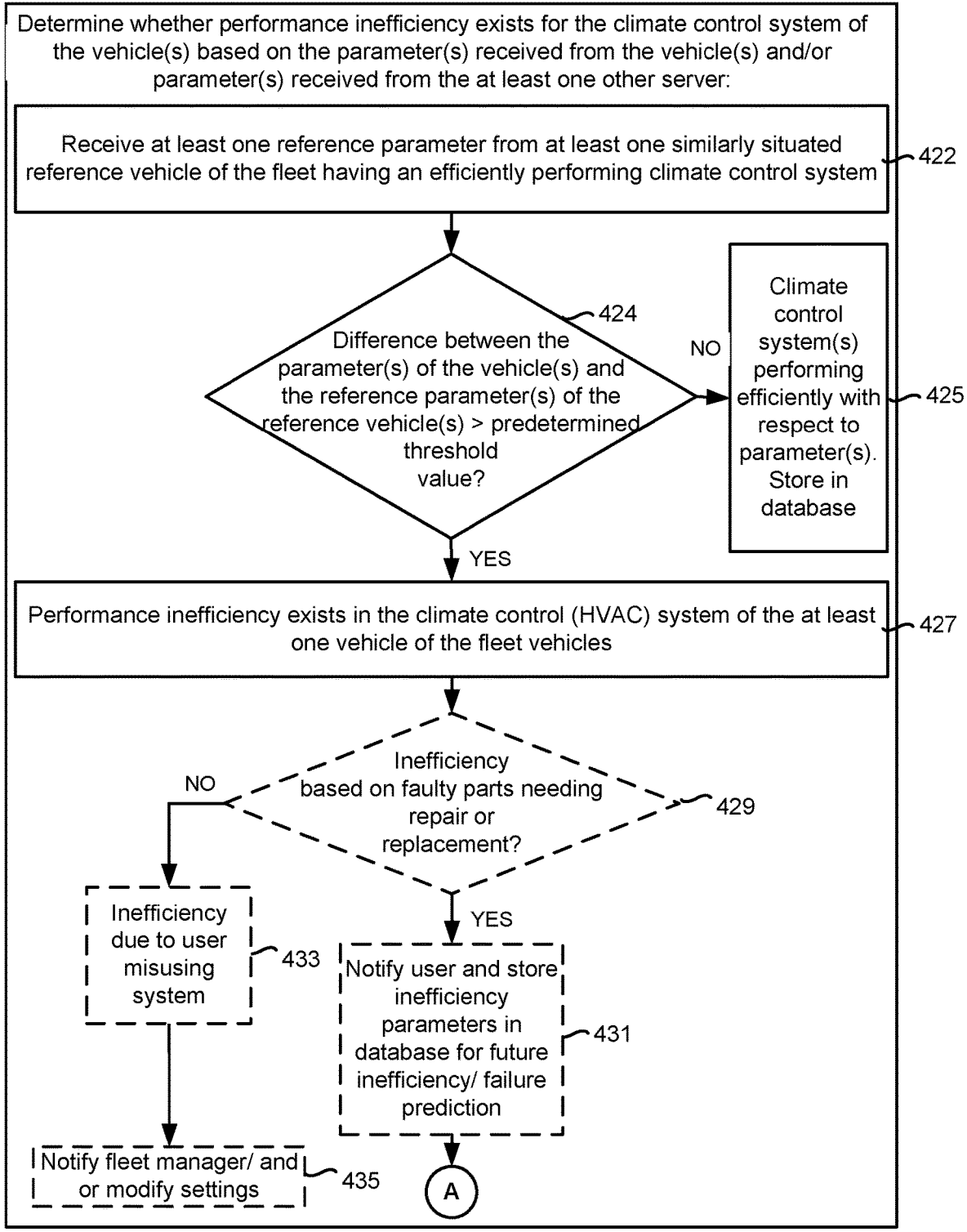

FIGS. 5A and 5B are flow diagrams illustrating exemplary methods for determining whether performance inefficiencies exist for the climate control system of the at least one vehicle of the fleet of vehicles according to teachings of the present invention. The flow diagrams of FIGS. 5A and 5B are examples of the determining step 420 of FIG. 4. As noted the performance inefficiencies are determined based on at least one of the received parameter(s) from the at least one vehicle and/or the received external parameter(s) from the at least one other server or source at steps 402-418.

The following are exemplary implementations for various parameters received by the fleet server 104 from the vehicle(s). The implementations are discussed with reference to steps 402-414 of FIG. 4 where the parameters are received from the vehicle. For example, in step 402, the parameter(s) may include the temperature set by a user of the at least one vehicle, $T_{SP}$, an ambient temperature inside the vehicle $T_I$, and a temperature outside of the vehicle, $T_O$, measured by one of the sensors 314, i.e., a temperature sensor 314 of the at least one vehicle. The climate control system of the vehicle with these parameters is deemed to be operating efficiently when $\Delta T$, (i.e., a difference between $T_{SP}$ and either $T_O$ or $T_I$) approximately equals a predetermined reference parameter value, $\Delta T_{REF}$, or is within a predetermined range. However, if a difference between $\Delta T$ is not approximately equal to $\Delta T_{REF}$ or is outside a predetermined threshold range of $\Delta T_{REF}$, then it is determined that a performance inefficiency exists in the climate control system of the vehicle(s).

In some implementations, the predetermined parameter reference value(s) or ranges of reference parameter values may be based on historical performance data of each vehicle of the fleet of vehicles stored in the memory 214. For example, historical performance data may include reference parameter values of efficiently performing climate control systems under various external conditions, parameter values of similarly situated reference vehicles with efficiently performing climate control systems, reference parameter values of the fleet of vehicles based on company overall efficiency data and company target data with respect to the one or more parameters.

In some implementations, as shown in step 404, when the parameter received from the vehicle is associated with ambient weather conditions, one of the sensors 314 of the vehicle senses an ambient temperature, $T_{AMB}$ surrounding the vehicle and transmits the parameter to the fleet server 104. The fleet server 104 receives the parameter and then compares $T_{AMB}$ to a reference ambient control parameter $T_{AMB(REF)}$ to determine whether the climate control system of the vehicle is operating inefficiently based on the difference between $T_{AMB}$ and $T_{AMB(REF)}$ similar to the implementation discussed with respect to the difference between $\Delta T$ and $\Delta T_{REF}$ described above.

Performance inefficiencies associated with the ambient weather conditions parameter may indicate that the vehicle climate control system is not performing efficiently with respect to weather conditions surrounding the vehicle. For example, the climate control system may be heating an inside of a vehicle even though the ambient temperature surrounding the vehicle is already very high.

In some implementations, as shown in step 406, when the parameters received from the vehicle are obtained from a thermal image profile of an occupant of the vehicle, the parameters may include infrared energy emitted, $E_{INF}$, by a user and captured by infrared sensors and/or thermal imaging devices 317 of the vehicle. Parameter(s) for infrared energy emitted indicate portions of the vehicle where a user may be located due to higher radiation emissions sensed based on body heat/temperature of a user or other occupants in comparison to unoccupied spaces of the vehicle. The fleet server 104 compares the infrared energy emitted, $E_{INF}$ to reference parameter value or a range of parameter values for infrared energy emitted, $E_{INF(REF)}$. In some implementations, the climate control system of the vehicle with these parameters is deemed to be operating efficiently when a difference between $E_{INF}$ and $E_{INF(REF)}$ is approximately zero or is within a predetermined threshold range. However, if a difference is not approximately zero or is outside the threshold range, then it is determined that the climate control system of the vehicle is operating inefficiently. For example, the server 104 may determine that a predetermined reference value or range of reference values for infrared energy emitted indicate an occupied space of the vehicle. If it is determined that the HVAC system is heating or cooling a space in the vehicle where the infrared energy emitted does not fall within the predetermined range of values or is not approximately equal to the predetermined reference value, the server determines that the HVAC system is heating or cooling an unoccupied space in the vehicle and therefore a performance inefficiency exists in the climate control system.

Performance inefficiencies with respect to the infrared energy emitted parameter $E_{INF}$ could indicate that climate control system is not effectively cooling or heating only occupied spaces in the vehicle, but instead wasting energy heating or cooling unoccupied spaces.

In some implementations, as shown in step 408, when the parameters received from the vehicle are associated with a loading of a condenser, the parameters typically include refrigerant pressure, refrigerant temperature, condenser temperature and an ambient temperature surrounding the condenser, to modulate condenser fan speed to save power when necessary. The fleet server 104 receives these parameters associated with a loading of the condenser from the vehicle and receives or identifies corresponding reference parameters from the database 106 as described previously for other reference parameters. The fleet server 104 compares the condenser loading parameters with corresponding condenser loading reference parameters, in a similar manner as described above with respect to other parameters. The fleet server 104 then determines whether performance inefficiencies exist in the climate control system of the vehicle based on the comparison of received and reference parameters and initiates the process to facilitate mitigation of the inefficiencies as described in further detail below.

In some implementations, the performance inefficiencies with respect to condenser loading may indicate that a condenser fan speed is too high (thus draining too much power from an auxiliary power source powering the climate control system) or too slow (thus providing insufficient cooling) for climate control system operations.

In some implementations, as shown in step 410, when the parameters received from the vehicle are associated with air conditioning operating conditions, the received parameters typically include air conditioning operating pressures and/or temperatures. Thus, the server 104 receives these parameters associated with air conditioning operating conditions from the vehicle and receives or identifies corresponding reference parameters (e.g., predetermined reference parameters or real time reference parameters) from the database 106 or from other sources in a similar manner as described previously for other reference parameters. The fleet server 104 compares the air conditioning operating pressures and/or temperatures with the corresponding predetermined air conditioning reference parameter(s), in a similar manner as described above with respect to other parameters. The fleet server 104 then determines whether performance inefficiencies exists in the climate control system of the vehicle based on the comparison and initiates the process to facilitate mitigation of the performance inefficiencies as described in further detail below.

Performance inefficiencies with respect to air conditioning operating pressures and/or temperatures may indicate that the air conditioning system is draining too much power or cooling insufficiently, which prevents the climate control system from functioning efficiently.

In some implementations, as shown in step 412, when the parameter(s) are associated with available power or voltage of an auxiliary battery coupled to an electrically powered compressor of the climate control system, the parameters typically include an energy rate consumption parameter. The fleet server 104 receives the parameter(s) associated with available power or voltage from the auxiliary power source load tester/voltage monitor 315 of the vehicle 102-1 and receives corresponding reference parameters from the database 106 in a similar manner as described previously for other reference parameters. The fleet server 104 compares the at least one parameter associated with available power or voltage from the vehicle with corresponding predetermined reference parameter(s), in a similar manner as described above with respect to other parameters. The fleet server 104 then determines whether performance inefficiencies exist in the climate control system of the vehicle based on the comparison and initiates the process to facilitate mitigation of the inefficiencies as described in further detail below.

In some implementations, as shown in step 414, when the parameters are associated with one or more zones of the vehicle, the parameters may include location coordinates corresponding to where in the vehicle a user or occupant may be located, measured e.g., by one of the sensors 314, i.e. an occupancy sensor, in relation to actual zones being cooled or heated. The zoning parameters facilitate determining whether the climate control system is efficiently cooling or heating the occupied spaces. The fleet server 104 receives these parameters associated with zoning from the vehicle and receives or identifies corresponding reference parameters from the database 106 (as described previously for other parameters) indicating coordinates of zones that should be cooled or heated given the parameters received from the vehicle. The fleet server 104 compares the zoning parameters with corresponding zoning reference parameter(s), as described above with respect to other parameters. The fleet server 104 then determines whether performance inefficiencies exist in the climate control system of the vehicle and in a similar manner as described for other parameters and initiates the process to facilitate mitigation of the inefficiencies as described for other parameters. Performance inefficiencies in the zoning parameters indicate that the vehicle may be wasting energy cooling or heating unoccupied zones of the vehicle.

In general, in the methods illustrated in FIG. 5A, the fleet server 104 receives from memory (e.g., database 106), predetermined reference parameter value(s) or a predetermined range of reference parameter values corresponding to at least one of the received parameters from the at least one vehicle 102-1 and/or other servers or sources, as shown by step 421. The fleet server 104 then compares the received reference parameter to the identified reference parameter value to determine whether inefficiencies exist in the operational settings of the at least one climate control system of the at least one vehicle 102-1, as shown by step 423. For example, the processor 105 of the fleet server compares the parameters(s) received from the at least one vehicle and/or parameter(s) received from the at least one other server 107, 108 to the reference values to determine whether one or more of the received parameters are equal to the predetermined reference parameter value(s) or within a predetermined range of the reference parameter values.

If it is determined, at step 423, that parameters(s) received from the at least one vehicle 102-1 and/or parameter(s) received from the at least one other server 107, 108 are approximately equal to the predetermined reference parameter value(s) or within the predetermined range of reference parameter values, then the climate control system is performing efficiently with respect to the vehicle parameter(s) and/or the external parameter(s) from the at least one other server 107, 108, and the parameter(s) are stored in the database 106 for future use or reference as shown by step 425. Otherwise, it is determined that the climate control system is performing inefficiently, as shown by step 427. For example, at step 427, the processor 105 of the fleet server 104 determines that a performance inefficiency exists in the climate control system of the at least one vehicle 102-1 when the parameter(s) received from the at least one vehicle 102-1 and/or parameter(s) received from the at least one other server/source 107, 108 are not approximately equal to the predetermined reference parameter value(s) or not within the predetermined range of reference parameter values.

In some implementations, the server 104 determines that performance inefficiencies exist in the climate control system(s) when the remaining power of the auxiliary power source(s) is less than that required to power the climate control system(s) to a final destination based on a processing of the parameters received from the at least one vehicle 102-1 at steps 402-414 along with the external parameters received from the other servers or sources 107, 108 at steps 416-418.

As described above, in some implementations, the fleet server 104 optionally receives at least one external parameter from the at least one other server or source remote from the fleet of vehicles, as shown by steps 415-418. The at least one external parameter received from the at least one other server 107, 108 or source is selected from the group consisting of a global positioning system (GPS), a weather prediction system, a map provider, a road and traffic conditions system, and a combination of any of the aforementioned.

At step 416, the fleet server 104 receives at least one external parameter relating to predicted weather conditions along a route of the vehicle(s) which may affect the parameters received from the vehicle(s) and the performance of the climate control system(s) of the vehicle. The fleet server 104 processes the external parameter(s) along with all or any of the parameter(s) received from the vehicle(s) at steps 402-414 to determine whether a performance inefficiency exists for the climate control system of the vehicle(s). For example, the processor 105 of the fleet server 104 processes external parameters associated with a route having an extremely difficult terrain and/or heavy traffic conditions along with a parameter(s) received from the vehicle, e.g. $T_{SP}$, and determines whether performance inefficiencies exist for the climate control system(s) based on remaining power of the auxiliary power source(s) powering the climate control system(s). Performance inefficiencies exist for example, when the remaining power of the auxiliary power source(s) is less than that required to power the climate control system(s) to a final destination based on the parameters received from the vehicle along with the external parameters.

In another example, the fleet server 104 instead processes at least one of the parameters received from the vehicle associated with loading of the condenser(s) described above along with the external parameters from the other servers or sources 107, 108 described above and determines whether performance inefficiencies exist for the climate control system(s) when the remaining power of the auxiliary power source(s) is less than that required to power the climate control system(s) to a final destination based on the parameters received from the vehicle 102-1 along with the external parameters, as described above.

In some implementations, the fleet server 104 initiates a fault detection procedure when a performance inefficiency exists in the climate control system of the at least one vehicle 102-1 of the fleet of vehicles, as shown by steps 429, 431, 433 and 435 of FIG. 5A. For example, at step 429, the fleet server 104 determines whether the determined performance inefficiency is based on a faulty device/part or application (e.g., software application) that is subject to repair or replacement. If it is determined that the performance inefficiency is based on the faulty part or application, then at step 431, the fleet server 104 notifies a user, i.e., driver of the vehicle about the faulty part or application. Otherwise, when the performance inefficiency is not caused by a faulty part or application, the fleet server 104 determines that the performance inefficiency is caused by user misuse of the climate control system, as shown by step 433. The fleet server 104 notifies the fleet owner of the misuse and/or the fleet server 104 may modify the settings when the inefficiency is caused by the user misuse, as shown by step 435. In some implementations, upon determining that the performance inefficiency is based on the user misuse of the climate control system, the fleet server 104 transmits a signal to the at least one vehicle to disable ability of the user to adjust operational settings of the climate control system of the at least one vehicle.

In other implementations, after a predetermined period of time or after determining that the climate control system of the at least one vehicle has been operating efficiently, the fleet server 104 transmits an override signal to the at least one vehicle to restore the user's ability to adjust the operational settings of the climate control system.

The fleet server 104, at step 431, also stores the faulty information and/or corresponding parameters indicating the fault in the database 106 for future inefficiency/failure prediction. Further, procedures are initiated by the fleet server to facilitate replacement or repair of the faulty part, as described in FIG. 5C.

In other implementations as illustrated in FIG. 5B, the fleet server 104 receives or identifies a reference parameter(s) from at least one similarly situated reference vehicle with an efficiently performing climate control system(s), as shown in step 422. At step 424, the processor 105 compares the respective parameter(s) received from the at least one vehicle to the reference parameter(s) received from the similarly situated reference vehicle(s) having the efficiently performing climate control system(s).

The aforementioned comparison is performed to determine whether the difference in parameter values of the at least one vehicle and the at least one similarly situated reference vehicle is within a predetermined threshold value. For example, it is determined that the climate control system of the at least one vehicle is performing efficiently when the difference is less than or equal to the predetermined threshold value, as shown in step 425. The predetermined threshold value is based on, but not limited to, historical experimental performance data, company overall efficiency data, and company target data. Otherwise, it is determined that the climate control system of the similarly situated vehicle is inefficient when the difference is greater than the predetermined threshold value, as shown in step 427. Similar to the implementation of FIG. 5A, the fleet server of FIG. 5B initiates a fault detection procedure when inefficiencies exist in the climate control system of the at least one vehicle of the fleet of vehicles, as shown in steps 429, 431, 433 and 435 of FIG. 5B.

The implementations of the present invention(s) provide(s) the advantage that by monitoring performance parameters of a climate control system of an individual vehicle of an entire fleet of vehicles, it is possible to identify outliers, i.e. individual vehicles in the fleet performing differently than similarly situated vehicles in the fleet and identify performance inefficiencies on this basis. In this sense, a fleet operator monitoring the conditions and performance efficiencies of multiple vehicles in a fleet of vehicles, may quickly and reliably identify issues with the outliers and be able to correct or adjust the operational settings of the outliers to ensure maximum efficiency within the fleet. The fleet operator or the user (i.e. the driver) in this case is also able to detect issues with any outliers before actual failure of any HVAC parts thereby reducing potential repair/replacement costs.

Figure 5C:
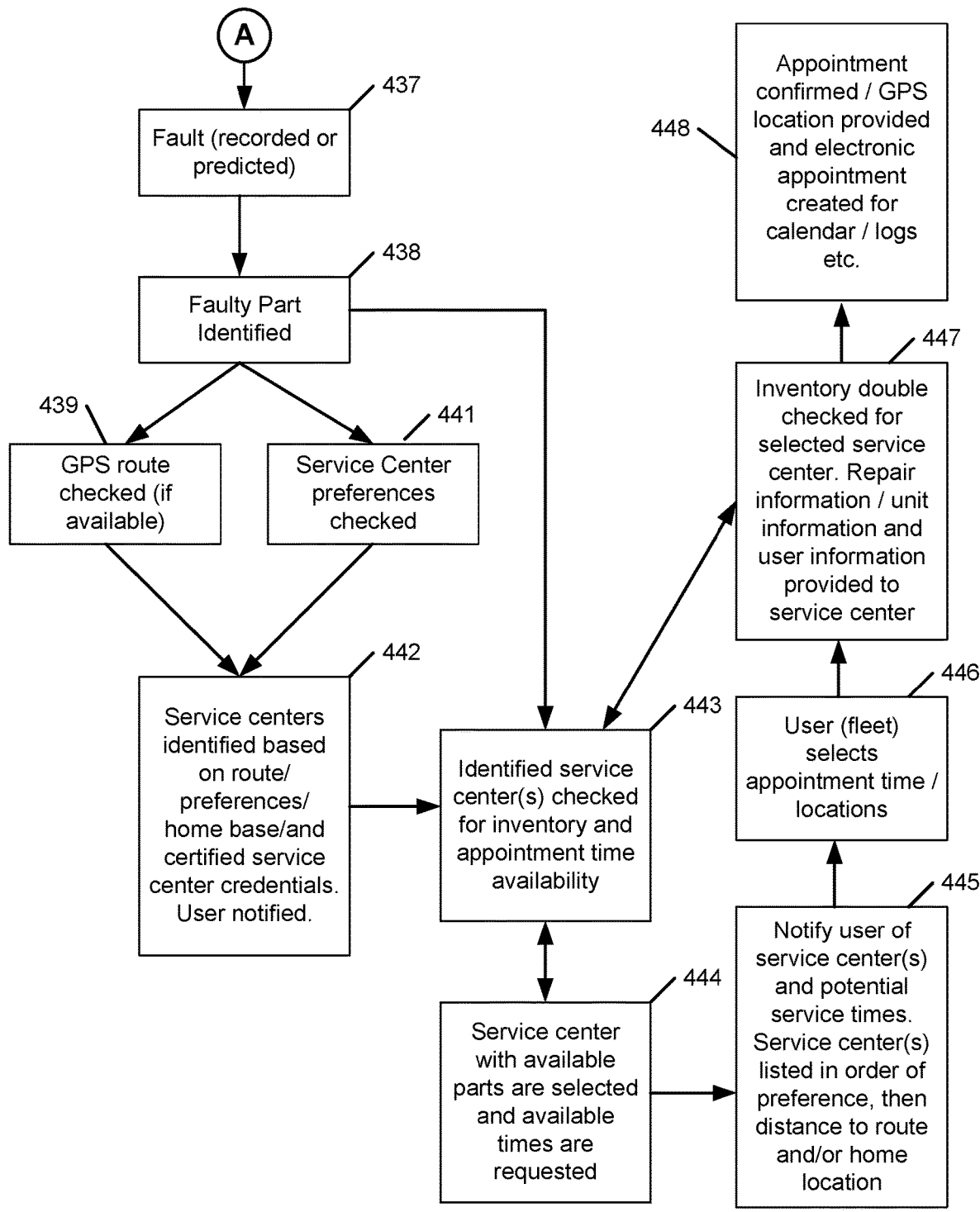
FIG. 5C is a flow diagram illustrating an exemplary method for identifying a faulty part or application (e.g., software application) causing a performance inefficiency in the climate control system of the at least one vehicle of the fleet of vehicles, in accordance with some implementations.

FIG. 5C is a flow diagram illustrating an exemplary method for identifying a faulty part or application (e.g., software application) that causes a performance inefficiency in the climate control system of at least one vehicle of the fleet of vehicles according to teachings of the present invention. When the faulty part is identified, a procedure is implemented to repair/replace the faulty part or application, according to teachings of the present invention. For explanatory purpose, FIG. 5C is discussed with reference to FIGS. 4, 5A and 5B.

In some implementations, upon determination that a performance inefficiency exist in the climate control (e.g., HVAC) system of the at least one vehicle 102-1 at step 427, the fleet server 104 determines that the inefficiencies are based on faulty software or a faulty part that needs replacement or repair at step 429. The fleet server 104 then initiates a replacement or repair procedure and/or notifies a user of the vehicle or an interested third party, e.g., the fleet operator of the faulty part or application of the vehicle. For example, the fleet server 104 transmits a signal to remote device(s), e.g. 103-1 informing the fleet operator that a faulty part exists that is interfering with the performance efficiency of the climate control system(s) of the vehicle(s). As illustrated in FIG. 5C, at step 438 the fleet server 104 identifies the faulty part by analyzing the parameters received from the vehicle(s) for which the performance inefficiency was determined along with historic performance data received from the database 106 indicating a result which pinpoints the failed part.

As further illustrated in FIG. 5C, when a fault is recorded or predicted at step 437, the fleet server 104 then receives a GPS route of the vehicle 102-1 from a GPS device 316 provided on the vehicle or from a navigation server 107 at step 439. At step 441, the fleet server 104 also receives or identifies location information of preferred service centers from the database 106 or from the navigation server 107 or from the GPS device 316 in the vehicle 102-1. At step 442, the fleet server 104 then processes the received information to identify or select at least one preferred service center along the route of the vehicle(s) with the faulty parts, and that can fix the identified faulty parts to determine and select potential service centers to take the vehicle(s) for service. The selection of the potential service centers is based on the preferred service center information, location of the home base, and certified service center credentials including ability to fix issues pertaining to the identified faulty part, which could be determined from a network system 110 supported by a network server, such as the internet. At step 443, the fleet server 104 then transmits a signal to servers of the selected service centers to check inventory of the failed part in question (e.g., by barcode, etc. . . . ) and availability of appointment times, and the servers of the selected service centers then transmit a signal back to the fleet server 104 with information of part and service time availability. At step 444, the fleet server 104 selects one or more service centers then transmits a request to the server(s) of the service center(s) having availability of the failed part(s) for the available service times. In response, the server(s) of the service centers having availability of the failed part(s) transmit signal(s) to the fleet server 104 with service center information listed in order of preference, and distance to destination on route of distance to fleet base station. At step 445, the fleet server transmits a notification of the aforementioned service center information to the user or fleet operator, and at step 446, the user or fleet operator selects a service center appointment time and location and transmits this information to the fleet server 104. The fleet server 104 then transmits a signal selecting an appointment time to the selected service center, and at step 447, double checks the inventory with the server of the service center and the service center server transmits a confirmation of the appointment time to the user or fleet operator. At step 448, the appointment is then confirmed. Once the service time is scheduled, (only after the inventory has been checked and confirmed) all pertinent information on how to fix the system is provided to the service technician.

Figure 6:
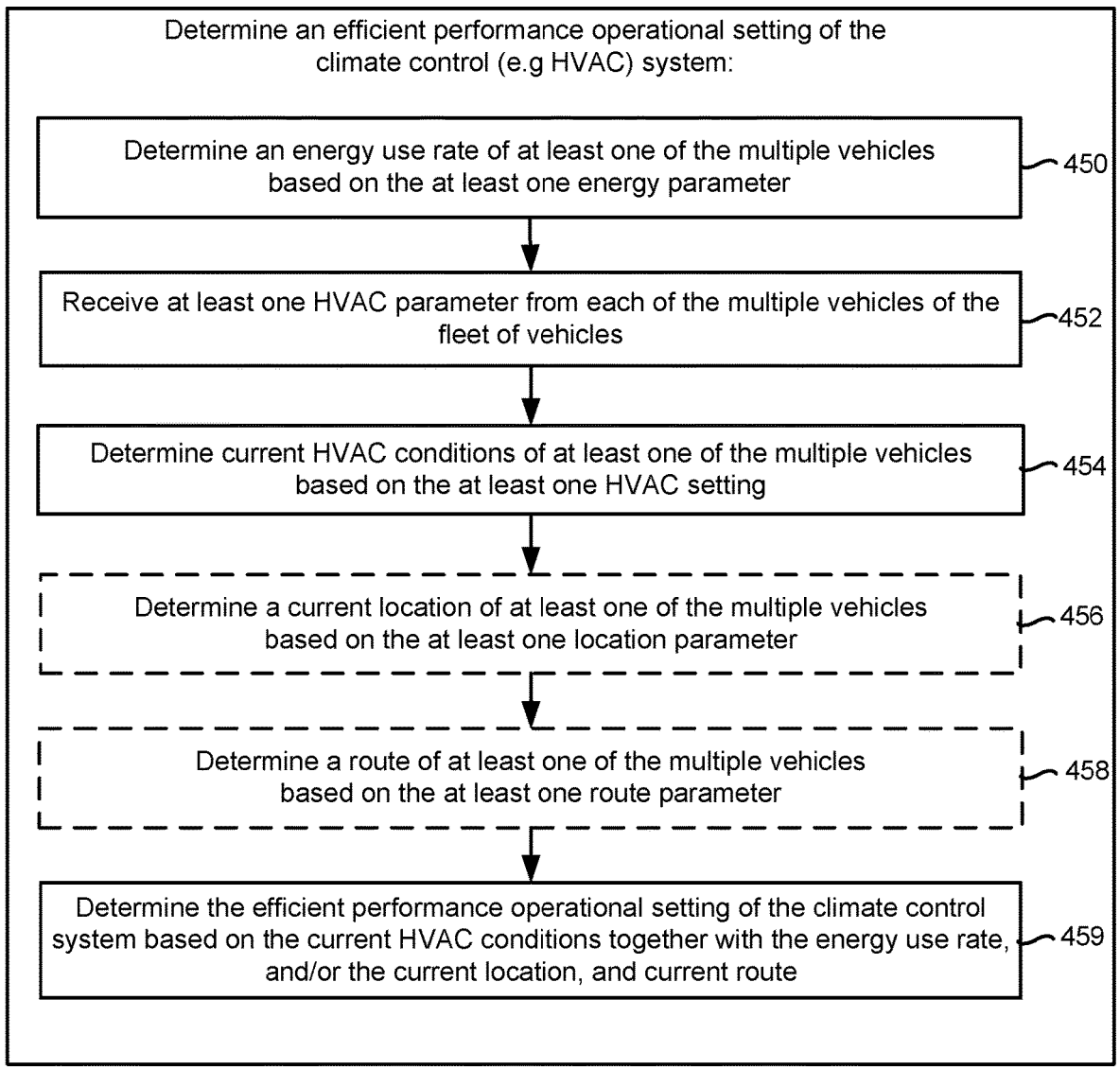
FIG. 6 is a flow diagram illustrating a method for determining an efficient performance operational setting of the climate control (e.g., HVAC) system(s), in accordance with some implementations.

FIG. 6 is a flowchart illustrating an exemplary method for determining a desired, i.e., an efficient performance operational setting, of the climate control system of the at least one vehicle of the fleet of vehicles according to teachings of the present invention.

As illustrated in FIG. 6, a method for determining an efficient operational setting of the climate control system of the at least one vehicle includes at step 450, determining, by the fleet server 104, an energy rate use of the auxiliary power source powering the climate control system based on the at least one parameter received at step 412 and associated with available power, e.g. energy used and remaining energy of the auxiliary power source. The fleet server 104 also takes into account temperatures along the travelled route(s), distance travelled, terrain, and traffic conditions received from the other server(s)/source(s) at steps 416 and 418 to determine an average energy use of the at least one vehicle 102-1.

At step 452, the fleet server 104 receives, from each vehicle, at least one current HVAC setting. The current HVAC settings are indicative of condenser fan speed, voltage and/or current set to compressor fan, temperature of air blown into the interior of the vehicle(s) and affect a remaining capacity of the auxiliary power source. The fleet server 104 then determines current HVAC conditions based on the at least one HVAC setting, as shown in step 454.

At step 456, the remote fleet server 104 determines a current location of at least one of the vehicles 102-1 based on the at least one location parameter received from each of the vehicles of the fleet of vehicles or from at least one of the other servers/sources at step 418. The location parameter may include location coordinates such as latitude and longitude indicating the location of at least one vehicle. At step 458, the fleet server determines a route of the at least one vehicle based on the at least one received route parameters from the GPS 316 of the at least one vehicle. The route parameter(s) are based on origination coordinates, destination coordinates, and route preferences (e.g. fastest time, shortest distance, avoidance preferences (e.g., avoid freeways). Alternatively, the route of the at least one vehicle is determined by the at least one other server/source at step 418 (e.g., navigation server 107) and sent to the fleet server 104.

At step 459, the fleet server processes the current HVAC conditions, energy use rate of auxiliary power source for the HVAC system, and/or the current location and route, and determines an efficient performance operational setting based on the determined current HVAC conditions in conjunction with the energy use rate, and/or the current location, and current route.

The efficient performance operational setting is based on, but not limited to the aforementioned parameters, and in some implementations is based on at least one other parameter or factor.

Alternatively, the fleet server 104 determines an efficient performance operational setting for an individual vehicle based on overall performance efficiency target rates of the fleet set by the operator of the fleet, or based on operational settings of efficiently performing vehicles in the fleet, adjusted by a factor to compensate for varying geographic and climate conditions.

Therefore, the present invention offers the advantage of positive reinforcement controls, i.e., the fleet server 104 sends a control signal that notifies the user(s) or the operator of the fleet of vehicles what the energy efficient operational settings will be for each climate control system based on the received parameters under the given conditions. In some implementations, the server 104 does not mandate the efficient operational settings but helps inform the user of the optimum settings for any of the settings described above, i.e. temperature set by a user in relation to ambient temperature in the vehicle and/or outside temperature surrounding the vehicle, ambient climate conditions, and all other parameters previously described.

Referring to FIG. 4, the method for remotely managing the climate control system further includes transmitting an operational setting instruction to the at least one vehicle to control the climate control system(s) of the at least one vehicle remotely, as shown in step 460. For example, upon determining the efficient setting, the fleet server 104 transmits a control signal to the at least one vehicle 102-1. The control signal includes the operational setting instruction for adjusting the current inefficient operational setting of the vehicle(s) to an efficient setting. Alternatively, the server transmits the control signal with the efficient operational settings to a remote third party device (e.g., remote device of the fleet operator) to inform the fleet operator of the inefficiencies and the improved operational settings. The fleet operator may decide whether adjustment is appropriate under the circumstances.

In some implementations, as illustrated in FIG. 4, the method for remotely managing the climate control system optionally includes generating a graphics instruction from the operational setting instruction based on a state of the auxiliary power source powering the electrically driven compressor of the climate control system and transmitting the graphics instruction to the controller to display as energy efficiency parameters, on a graphical user interface (GUI), as shown by step 500.

Figure 7:
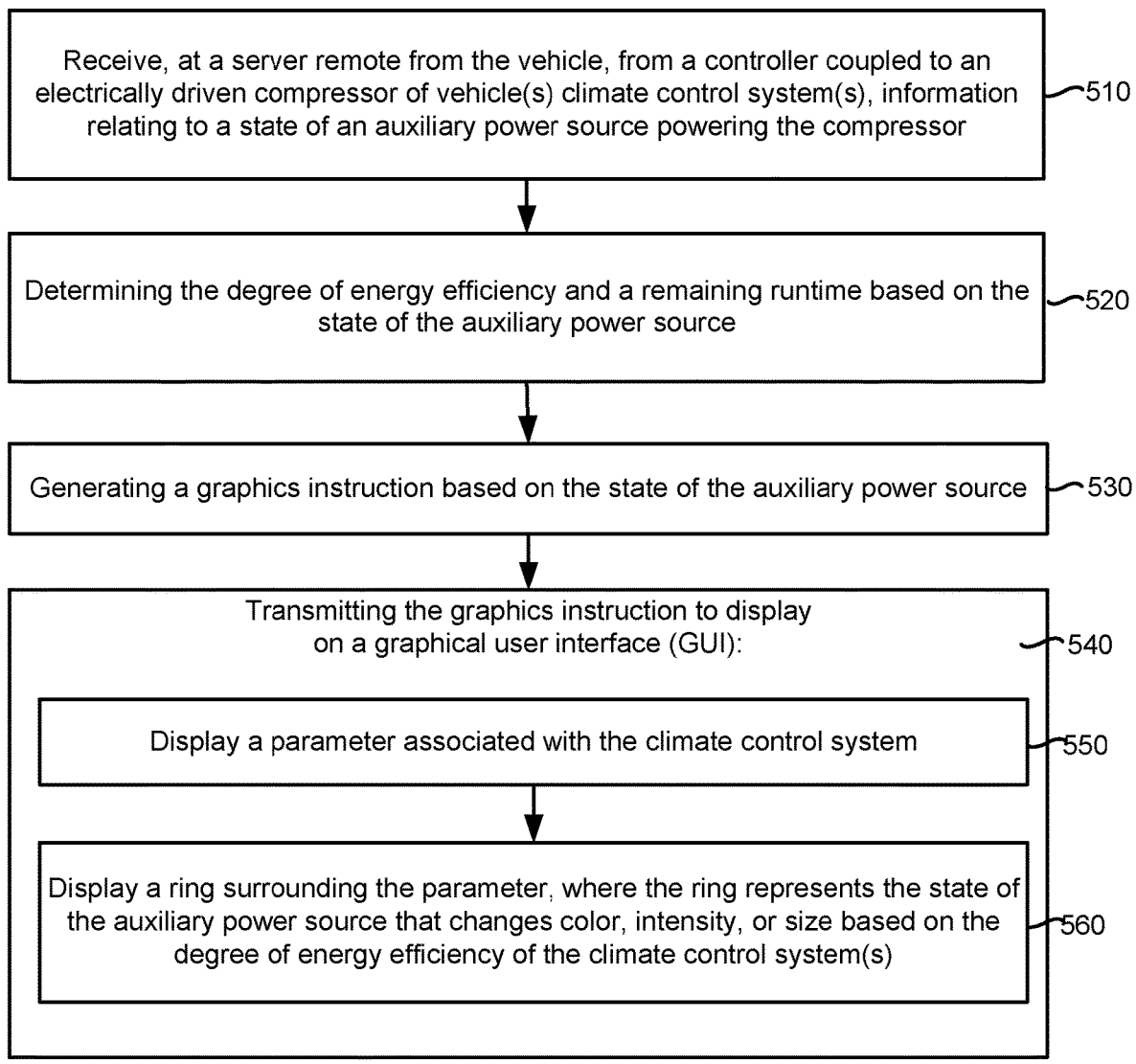
FIG. 7 is a flow diagram illustrating a method for generating a graphics instruction to display a graphical user interface (GUI) depicting energy efficiency parameters or characteristics of the climate control system(s) of the at least one vehicle of the fleet of vehicles, in accordance with some implementations.

FIG. 7 illustrates a method for displaying energy efficiency parameters or characteristics of a vehicle climate control system of at least one vehicle where the climate control system includes a controller (CPU 304) coupled to an electrically driven compressor that is powered by an auxiliary power source. As illustrated in FIG. 7, at step 510, the server 104 receives, from the controller 304 coupled to the electrically driven compressor of the climate control system, information relating to a state of the auxiliary power source powering the electrically driven compressor. At step 520, the fleet server 104 determines the degree of energy efficiency and a remaining runtime based on the state of the auxiliary power source, and at step 530, the fleet server 104 generates a graphics instruction based on the state of the auxiliary power source. At step 540, the fleet server 104 transmits, the graphics instruction to be displayed on a graphical user interface (GUI) in a form of (i) a parameter (e.g. 808, 822 illustrated in FIG. 8) associated with the climate control system, and (ii) a ring 806 surrounding the parameter, in which the ring 806 represents the state of the auxiliary power source that changes color, intensity, or size based on the degree of energy efficiency of the climate control system of the at least one vehicle.

At step 550, the parameter associated with the climate control system of the at least one vehicle is displayed, and at step 560, a ring surrounding the parameter is displayed at the GUI, in which the ring represents a state of the auxiliary power source. In some implementations, the ring changes color, intensity, or size based on a degree of energy efficiency of the climate control system of the at least one vehicle.

In some implementations, the parameter associated with the climate control system of the at least one vehicle and which is displayed inside the ring is selected from a group including a percentage efficiency e.g., 808 at which the climate control system for the at least one vehicle of the fleet of vehicles operates, ambient conditions in the vehicle, e.g., 822, remaining power of the auxiliary power source, remaining runtime, e.g., 826, and system health of the climate control system for the at least one vehicle.

The energy efficiency information represents current and improved operational settings of the climate control systems. Displaying the energy efficiency information on the GUI allows the user, (e.g. the driver) or the fleet operator to be able to view the current operational settings of the climate control system of a corresponding vehicle. When informed through the GUI, the fleet operator and/or the user can also adjust operational settings of the climate control system. The graphics instruction may be displayed on the GUI of the vehicle, e.g. dashboard display or the GUI of a mobile device monitored by the fleet operator.

Figure 8:
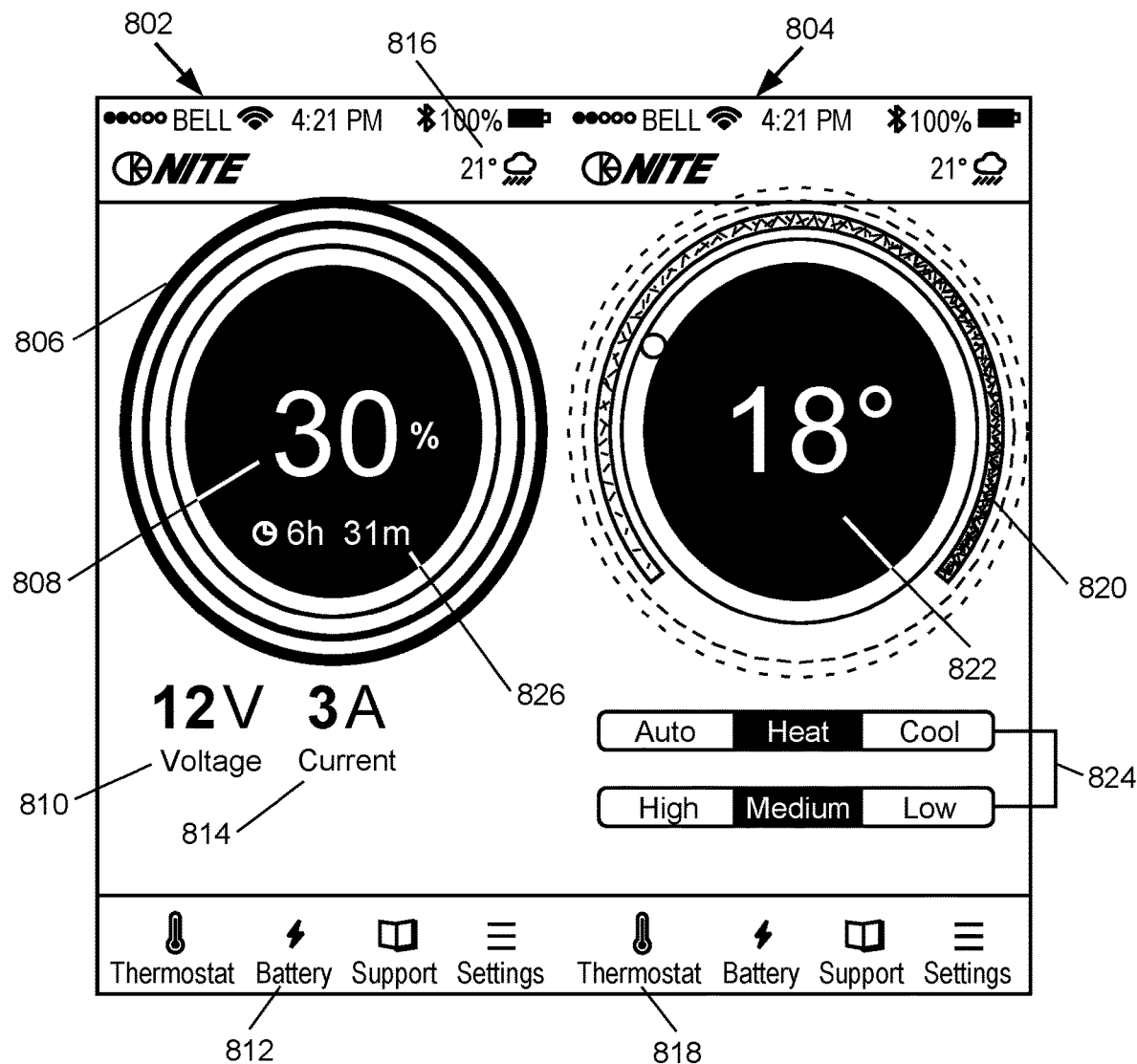
FIG. 8 is a diagram illustrating a Graphical User Interface (GUI) display in accordance with some implementations.

In some implementations, as illustrated in FIG. 8, and as described above, the glowing ring 806 changes color, intensity or size based on the degree of energy efficiency of the climate control system. For example, if the graphics instruction contains information relating to alert(s) indicating performance inefficiencies, e.g., a current setting which is quickly draining an auxiliary power source, this information is displayed on the GUI 802, 804 as an illuminated battery icon 812 and the glowing ring 806 of a certain color, or the glowing ring growing in size as illustrated by the concentric rings changing size from the inner to the outer ring to indicate energy depletion of the battery, e.g. a red glowing ring appearing around an efficiency dial indicator to signify energy depletion, the ring growing larger as the inefficiency and energy depletion continue. Once the operational settings are changed by the user, the glowing ring may reduce in size and change color, e.g. to a green ring, indicating an increase in energy conservation. The battery icon 812 on the GUI may then be dimmed and a recalculated run-time 826 may appear based on the adjusted operational settings. Furthermore, various other parameters are displayed on the GUI 802, including but not limited to a voltage 810, a current 814, an operating condition of a thermostat 818, an ambient temperature 822 inside the vehicle and a second ring 820 changing color with a degree of intensity of the ambient temperature 822, a heating or cooling setting 824 of the climate control system set by the user, ambient climate condition 816.

The systems and methods of the present invention provide advantages of having a central server simultaneously monitoring and controlling the climate control systems of a fleet of vehicles as this allows system wide limitations to be set for the fleet to reliably identify and correct any outlier vehicles within the fleet (sometimes using operational settings of similarly situated vehicles in the fleet to correct the outlier vehicle operational settings) and to ensure the systems are performing as consistently and as efficiently as possible. Performance inefficiencies can be identified and corrected through the central fleet server sending out a control signal with instructions in real time either to the vehicle to control the operational settings of the climate control system to the more efficient settings, or to a "smart" mobile device of a fleet operator to remotely change the settings based on some visual instruction generated on the mobile device as a result of the control instruction. For example, the fleet operator can execute unique commands in response to the control signal from the central server, including, but not limited to limiting a temperature set point of the vehicle, or lowering blower speed of a condenser fan, and the like. Furthermore, by virtue of controlling a fleet versus an individual vehicle, the fleet operator can monitor in real time fuel saved and other efficiency data of the entire fleet to easily compare this to company goals and make adjustments in real time in a continuous effort to achieve company goals.

In some implementations of the present invention, the server institutes advanced control aspects, including but not limited to run time calculators, eco modes, addition of badges, and positive reinforcement as described above. Runtime calculators are displayed on a GUI as described above and operate as a visual indicator to a user of runtime until final destination. The addition of badges and gamification act in the context of the invention as an incentive for users to operate the climate control systems of the vehicles in the fleet as efficiently as possible. Through gamification and different levels achievable depending on the level of efficient climate control system operation of each user, competition is created among the users (i.e. drivers) to achieve certain levels and reap rewards for their efforts in maintaining efficient climate control conditions in their respective vehicles.

In some implementations, the server runs an algorithm which determines a level of efficiency of each vehicle and assigns a certain weight to it. The weight assigned may correspond to the amount of energy savings rewards that a user unlocks for use at a time of their choosing, i.e. the user can use the energy savings rewards to indulge and run the system inefficiently if he/she so chooses expending an energy amount up to the energy savings rewards amount. For example, if the user desires a temperature inside the vehicle to be cooler than a current efficient setting, the user having the energy savings reward can override the efficient setting and run the climate conditioning system at a less efficient setting using up more energy to cool the vehicle interior to his/her desired level. The user may in this sense run the climate control system of the vehicle inefficiently for his/her benefit until his/her energy saving rewards amount is expended.

A description of badge examples and the various levels attainable by the users through gamification is provided below according to teachings of the present invention.

Figure 9:
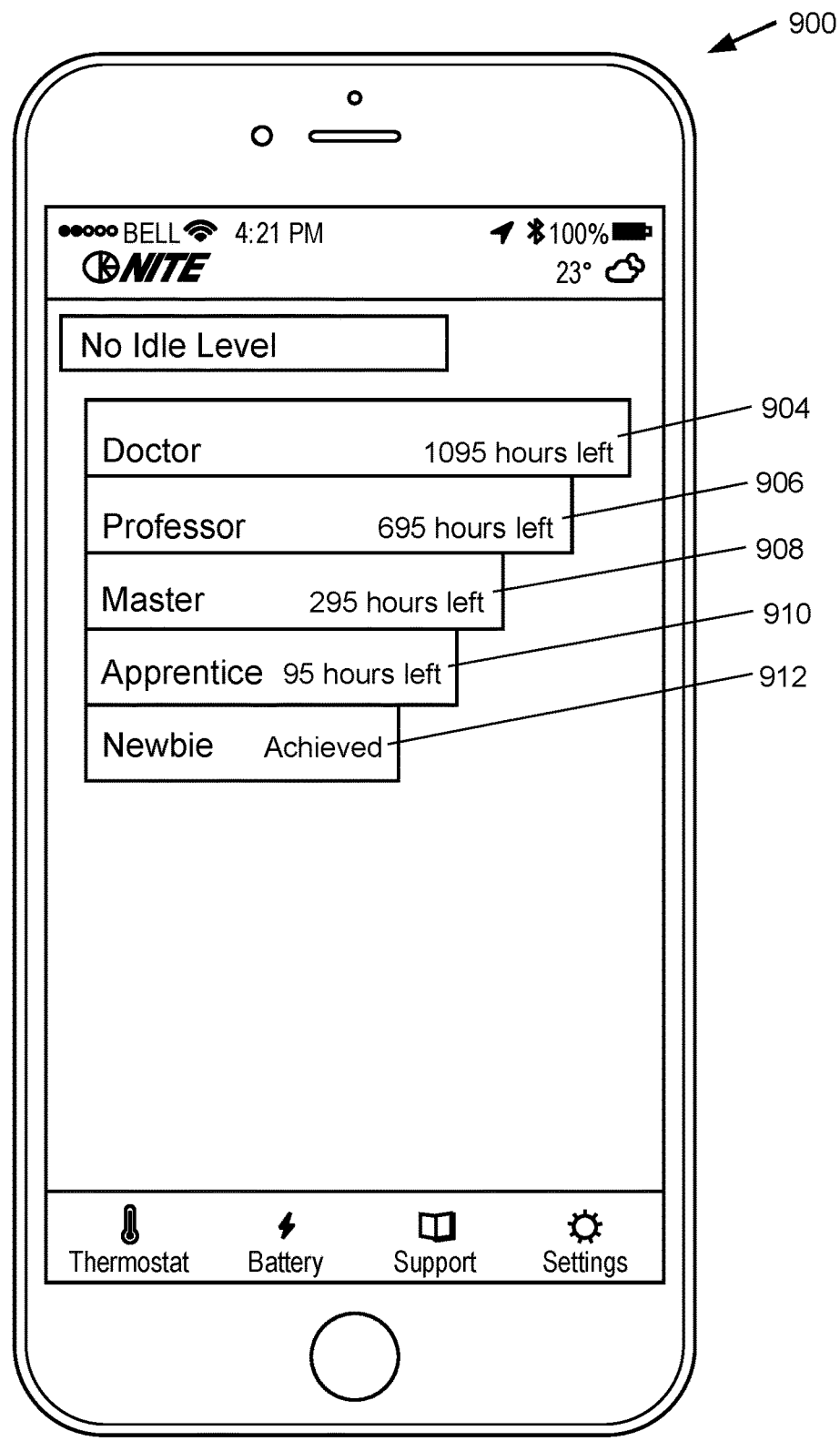
FIG. 9 is a GUI illustration of competitive levels of energy efficiency achievable by users operating climate control systems efficiently through gamification, in accordance with some implementations.

Levels:

FIG. 9 is a GUI illustration on a mobile device 900 of competitive levels of energy efficiency achievable by users through gamification by operating climate control systems efficiently, according to teachings of the present invention. In some implementations, various levels of energy efficiency can be attained by users in the fleet. Examples of the achievable levels include but are not limited to a doctor 904, a professor 906, a master 908, an apprentice 910 and a newbie 912, in descending order of skill. A number hours of running a climate control system efficiently that is required in order to achieve each skill level is displayed on the GUI, adjacent to the corresponding skill level. Levels are earned through usage time, and are not available for sale to the users. This limitation would ensure that the users are only assigned to a certain level as an indication of their proficiency at running the climate control system of their vehicle as efficiently as possible. The more efficiently the users run their climate control systems, the more functions are unlocked—for example, the energy savings rewards as described above. The aforementioned aspects provide several advantages of keeping users engaged, creating goals and providing incentive to the users to run their systems efficiently as possible. Therefore, overall energy efficiency of a fleet of vehicles may increase due to competition among the users.

In some implementations, the levels can be shared through social media, and used for promotional purposes.

Figure 10:
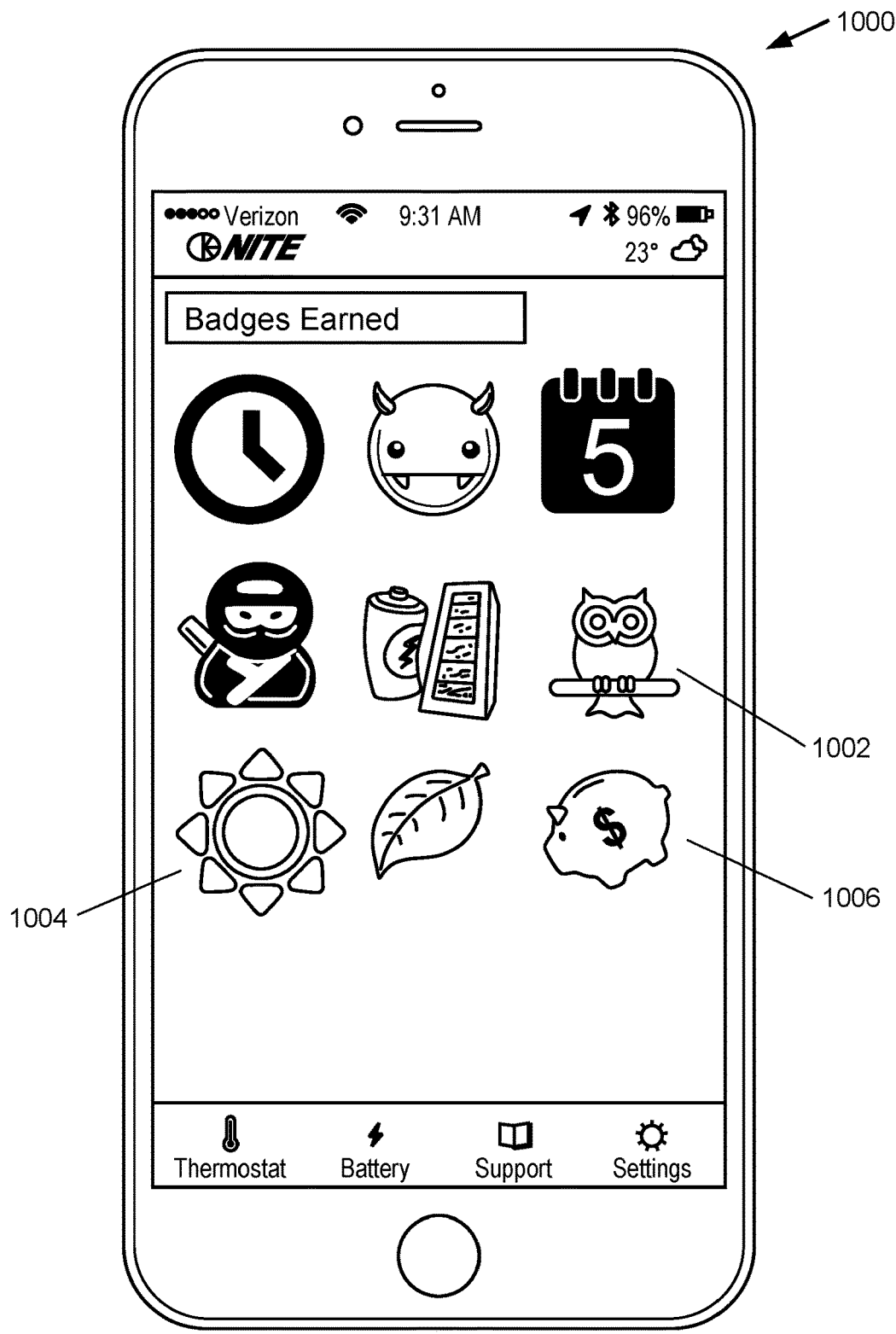
FIG. 10 is a GUI illustration of badges that can be earned by completing various tasks in running the vehicle(s) control systems efficiently, in accordance with some implementations.

Badges:

FIG. 10 is a GUI illustration on a mobile device 1000 of badges that can be earned by completing various tasks when running the vehicle(s) climate control systems efficiently, according to teachings of the present invention. In some implementations, badges are earned by completing certain tasks involving running the climate control system(s) of the vehicle(s) efficiently. For example, a user running an air conditioning system of the climate control system at an efficient operational temperature setting of the vehicle for a predetermined amount of time earns a badge which unlocks a specific function providing some benefit to the user such as a function allowing the user to purchase batteries at reduced prices, or a function temporarily lowering a voltage at which the climate control system turns off to protect the batteries. Different badges are available depending on a user's level of skill. The aforementioned aspects provide several advantages of keeping users engaged, creating goals and providing incentive to the users to run their climate control systems as efficiently as possible. Therefore, overall energy efficiency of a fleet of vehicles may increase due to competition among the users.

Badge Examples

The Scheduler: User uses the climate control system around the same time every day for a predetermined period, e.g. 10 days, unlocks a "NITE" no idle system alarm clock function.

Eco Monster: User runs "NITE" unit under optimum settings for a certain amount of hours, unlocks run time calculator. Available for Immediate purchase 5 Day Stretch: User uses "NITE" system 5 days in a row. Unlocks screen customizations within app.

Weekend Warrior: User uses no idle system over the weekend. Sends user the opportunity to purchase a battery charger at reduced price.

Full Power: User has batteries fully charged before NITE system use 85% over last 30 days. Unlocks ability to purchase an Extended Run Time (XRT) function, i.e. function allowing the climate control system to dip below the cutoff voltage on the auxiliary batteries or the cutoff on the starting batteries to allow the system to run longer. The XRT function temporarily lowers the Low Voltage Disconnect (LVD), i.e. the voltage at which the system turns off to protect the batteries.

Other badge examples which can be earned include, but are not limited to the night watchmen 1002, day breaker 1004 and an energy savings bank, porkins 1006.

Figure 11:
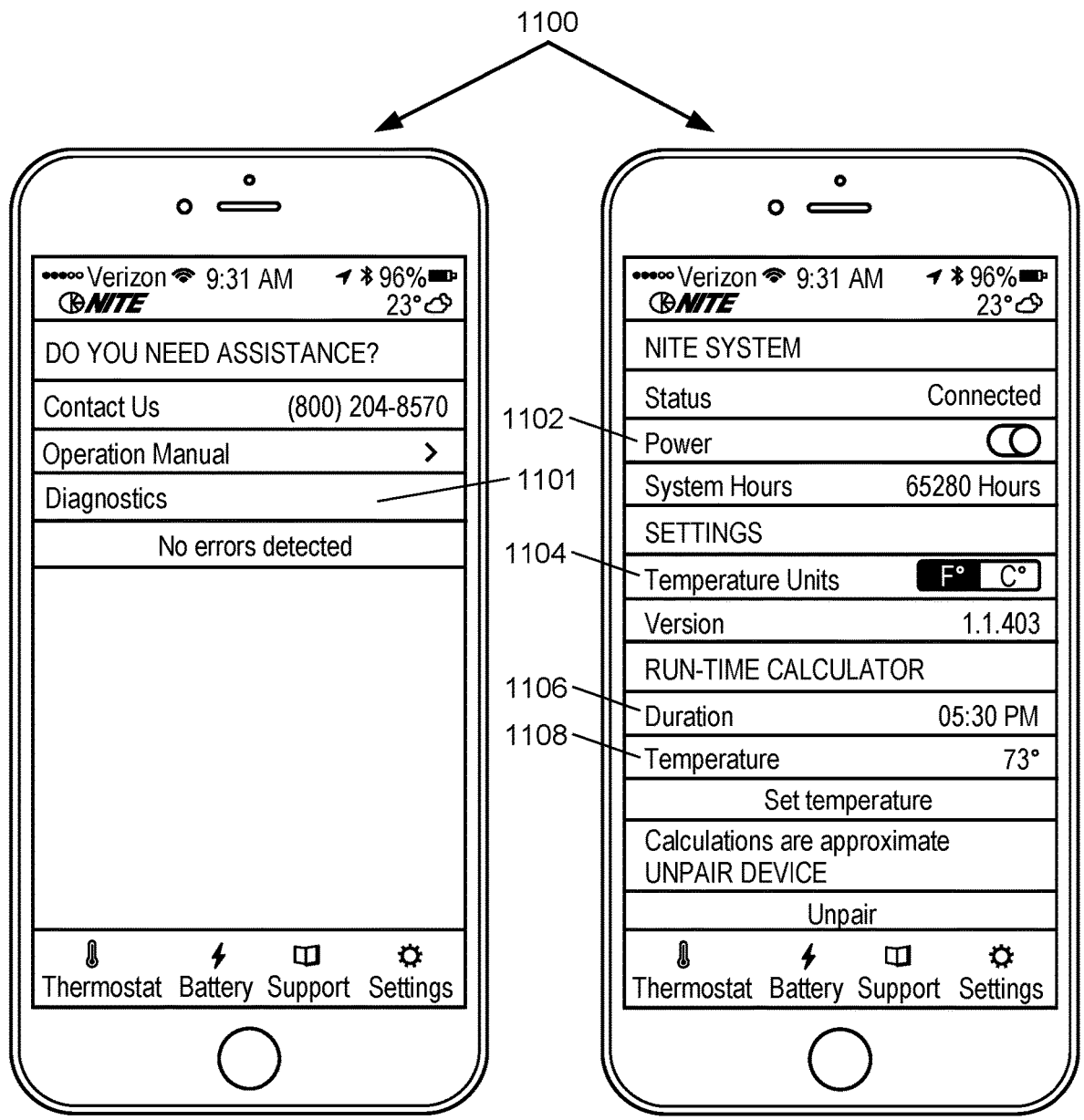
FIGS. 11 and 12 are GUI illustrations of energy parameters and characteristics of a climate control system of at least one vehicle displayed on a mobile phone, in accordance with some implementations.
Figure 12:
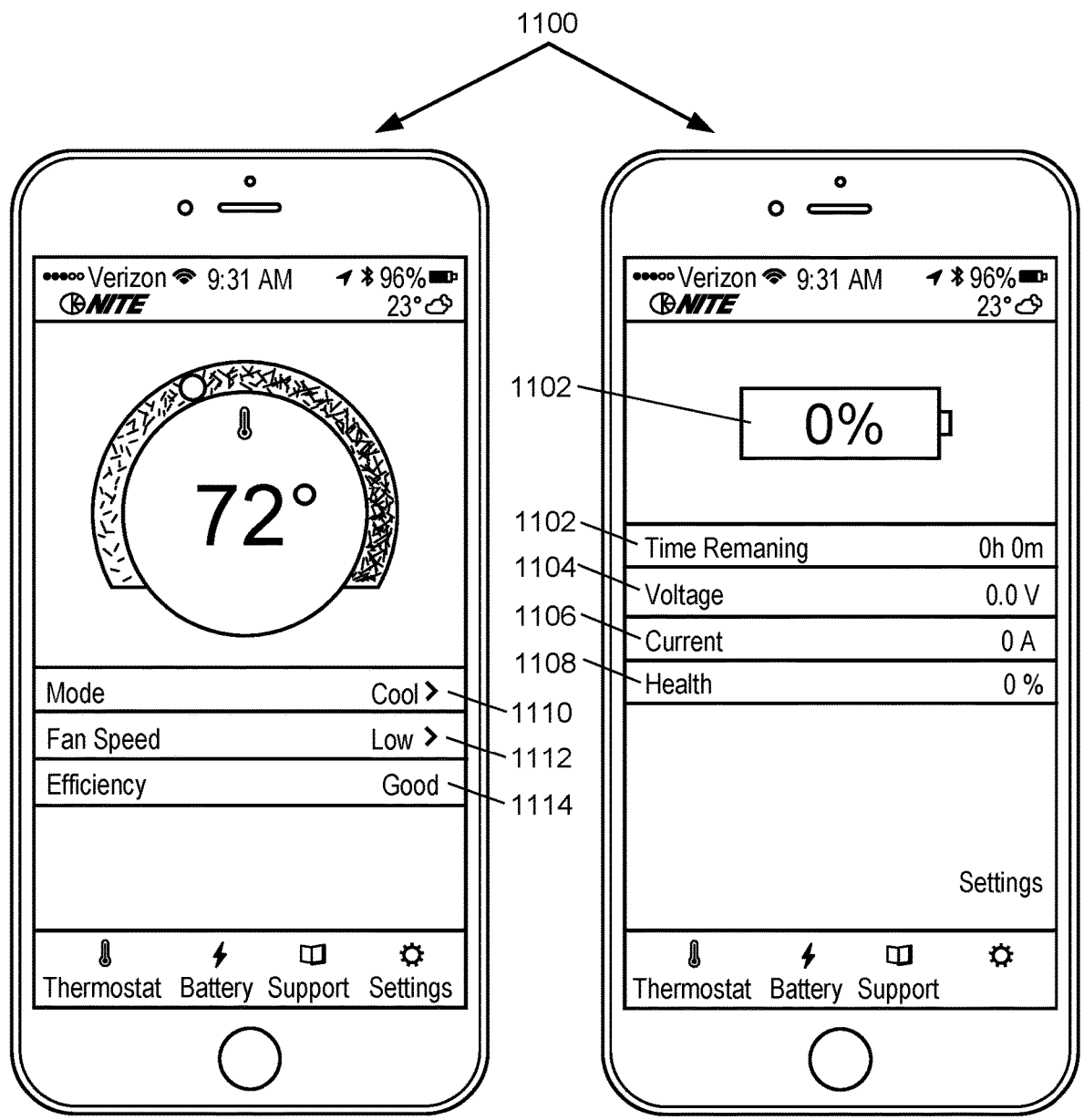

FIGS. 11 and 12 are GUI illustrations of energy parameters and characteristics of a climate control system of at least one vehicle displayed on a mobile device, in accordance with some implementations.

As illustrated in FIGS. 11 and 12, in some implementations, a user or a fleet operator may view and monitor the various energy parameters and characteristics of the vehicle climate control system on the GUI of the "smart" mobile device 1100, e.g. a smart phone. Parameters and characteristics of the climate control system displayed on the mobile device 1100 may include, but are not limited to, diagnostics information 1101 relating to the climate control system, a power level 1102 of an auxiliary power source of the climate control system, measurement units 1104 for a temperature set by the user, a duration 1106, i.e. an approximate time up to which auxiliary power source of the climate control system will last under current parameters, e.g., a set temperature 1108, an air conditioner operating mode 1110 and fan speed level 1112, an overall efficiency level 1114 of the climate control system. In some implementations, the displayed parameters and characteristics of the climate control system may represent a completely drained auxiliary power source of the climate control system, as indicated by values of zero for all of a battery charge state 1116, a time remaining 1118 until the auxiliary power source in completely exhausted, a voltage 1120 and a current 1122 of the auxiliary power source, and a system health 1124 of the climate control system based on remaining power of the auxiliary power source.

The methods illustrated in FIGS. 4-7 and described above are governed by instructions that are stored in a computer readable storage medium and that are executed by at least one processor of at least one electronic device (e.g., one or more vehicles of a fleet of vehicles 102-$n$, one or more remote devices 103-$n$, or a fleet server 104). Each of the operations shown in FIGS. 4-7 corresponds to instructions stored in a non-transitory computer memory or computer readable storage medium. In various implementations, the non-transitory computer readable storage medium includes a magnetic or optical disk storage device, solid state storage devices, such as Flash memory, or other non-volatile memory device or devices. The computer readable instructions stored on the non-transitory computer readable storage medium may be in source code, assembly language code, object code, or other instruction format that is interpreted and/or executable by one or more processors (or cores).

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the implementation(s). In general, structures and functionality presented as separate components in the example configurations may be implemented as a combined structure or component. Similarly, structures and functionality presented as a single component may be implemented as separate components. These and other variations, modifications, additions, and improvements fall within the scope of the implementation(s).

It will also be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined (that a stated condition precedent is true)" or "if (a stated condition precedent is true)" or "when (a stated condition precedent is true)" may be construed to mean "upon determining" or "in response to determining" or "in accordance with a determination" or "upon detecting" or "in response to detecting" that the stated condition precedent is true, depending on the context.

The foregoing description included example systems, methods, techniques, instruction sequences, and computing machine program products that embody illustrative implementations. For purposes of explanation, numerous specific details were set forth in order to provide an understanding of various implementations of the inventive subject matter. It will be evident, however, to those skilled in the art that implementations of the inventive subject matter may be practiced without these specific details. In general, well-known instruction instances, protocols, structures and techniques have not been shown in detail.

The foregoing description, for purpose of explanation, has been described with reference to specific implementations. However, the illustrative discussions above are not intended to be exhaustive or to limit the implementations to the precise forms disclosed. Many modifications and variations are possible in view of the above teachings. The implementations were chosen and described in order to best explain the principles and their practical applications, to thereby enable others skilled in the art to best utilize the implementations and various implementations with various modifications as are suited to the particular use contemplated.

What is claimed is:

1. A method for managing power of a vehicle, comprising:
at a server:
receiving, from a communicatively coupled vehicle, one or more parameters associated with a power source that is used to power a climate control system of the vehicle; and
in accordance with a determination that a performance inefficiency exists based at least in part on the one or more parameters associated with the power source:
generating an operational setting instruction based on an efficient operational setting that is determined to reduce a drain of the power source such that the performance inefficiency no longer exists; and
transmitting the operational setting instruction to the vehicle to control the power source.

2. The method of claim 1, wherein the one or more parameters associated with the power source are selected from the group consisting of:
remaining power;
voltage; and
energy rate consumption.

3. The method of claim 1, wherein the determination that the performance inefficiency exists is further based at least in part on one or more parameters associated with at least one other source selected from the group consisting of:
a global positioning system (GPS);
a weather predication system;
a map provider;
a road and traffic conditions system; and
a combination thereof.

4. The method of claim 1, wherein the determination that the performance inefficiency exists further comprises:
receiving, from a database, at least one predetermined reference parameter value or range of values corresponding to a predetermined performance operational setting associated with the power source;
comparing the predetermined reference parameter value or range of values to a respective parameter of the one or more parameters associated with the power source; and
determining, based at least in part on the comparison, whether the performance inefficiency exists.

5. The method of claim 4, further comprising:
determining whether the performance inefficiency is based on a faulty part or user operation of the climate control system.

6. The method of claim 5, further comprising:
in accordance with a determination that the performance inefficiency is based on the faulty part, providing a notification to the vehicle alerting a user of the vehicle.

7. The method of claim 5, further comprising:
in accordance with a determination that the performance inefficiency is based on the user operation of the climate control system, transmitting a signal to the vehicle to disable ability of the user of the vehicle to adjust operational settings of the climate control system.

8. The method of claim 7, further comprising:
after a predetermined period of time or after determining that the climate control system has been operating efficiently, transmitting an override signal to the vehicle to restore the user's ability to adjust the operational settings.

9. The method of claim 5, wherein upon determining that the performance inefficiency is based on the faulty part:
determining at least one preferred service center along a route of the vehicle; and
providing a notification to the user of the vehicle, notifying a user of the at least one preferred service center.

10. The method of claim 1, wherein the vehicle is one of a fleet of vehicles and the determination that the performance inefficiency exists further comprises:
determining at least one similarly situated reference vehicle of the fleet of vehicles having an efficiently performing climate control system;
comparing at least one respective parameter of the one or more parameters associated with the power source of the vehicle to at least one reference parameter received from the at least one similarly situated reference vehicle; and
determining, based at least in part on the comparison, whether the performance inefficiency exists.

11. The method of claim 1, wherein the vehicle is one of the fleet of vehicles and the method further comprises:
receiving, from each vehicle of the fleet of vehicles, at least one parameter associated with a respective power source;
aggregating the received at least one parameter associated with the respective power source from each vehicle of the fleet of vehicles;
storing the aggregated parameters in a database associated with the fleet of vehicles; and
using the stored aggregated information to predict future faults in the climate control system of the vehicle.

12. The method of claim 1, further comprising receiving information regarding an energy use rate and current heating, ventilation, and air conditioning (HVAC) conditions for the vehicle; and wherein the efficient operational setting is determined based on the current HVAC conditions and the energy use rate.

13. The method of claim 1, wherein the operational setting instruction further comprises a graphics instruction to the vehicle to display on a graphical user interface (GUI), wherein the GUI depicts energy efficiency information associated with the climate control system of the vehicle.

14. The method of claim 1, further comprising:
receiving additional information relating to an updated state of the power source;

determining a new degree of energy efficiency and a new remaining runtime based on the updated state of the power source; and generating an updated graphics instruction based on the updated state of the power source.

15. A non-transitory computer-readable storage medium including instructions that, when executed by a server, cause the server to:

receive, from a communicatively coupled vehicle, one or more parameters associated with a power source that is used to power a climate control system of a vehicle; and in accordance with a determination that a performance inefficiency exists based at least in part on the one or more parameters associated with the power source:

generate an operational setting instruction based on an efficient operational setting that is determined to reduce a drain of the power source such that the performance inefficiency no longer exists; and transmit the operational setting instruction to the vehicle to control the power source.

16. The non-transitory computer-readable storage medium of claim 15, further including instructions that, when executed by the server, cause the server to:

receive from a database, at least one predetermined reference parameter value or range of values corresponding to a predetermined performance operational setting associated with the power source;

compare the predetermined reference parameter value or range of values to a respective parameter of the one or more parameters associated with the power source; and determine, based at least in part on the comparison, whether the performance inefficiency exists.

17. The non-transitory computer-readable storage medium of claim 15, wherein the vehicle is one of a fleet of vehicles and the determination that the performance inefficiency exists further comprises:

determine at least one similarly situated reference vehicle of the fleet of vehicles having an efficiently performing climate control system;

compare at least one respective parameter of the one or more parameters associated with the power source of the vehicle to at least one reference parameter received from the at least one similarly situated reference vehicle; and determine, based at least in part on the comparison, whether the performance inefficiency exists.

18. A system for managing power of a vehicle, the system comprising:

a vehicle; and a server communicatively coupled with the vehicle; and wherein the system is configured to, at the server:

receive, from a communicatively coupled vehicle, one or more parameters associated with a power source that is used to power a climate control system of the vehicle; and in accordance with a determination that a performance inefficiency exists based at least in part on the one or more parameters associated with the power source:

generate an operational setting instruction based on an efficient operational setting that is determined to reduce a drain of the power source such that the performance inefficiency no longer exists; and transmit the operational setting instruction to the vehicle to control the power source.

19. The system of claim 18, wherein the system is further configured to, at the server:

receive from a database, at least one predetermined reference parameter value or range of values corresponding to a predetermined performance operational setting associated with the power source;

compare the predetermined reference parameter value or range of values to a respective parameter of the one or more parameters associated with the power source; and determine, based at least in part on the comparison, whether the performance inefficiency exists.

20. The system of claim 18, wherein the system is further configured to, at the server:

determine at least one similarly situated reference vehicle of the fleet of vehicles having an efficiently performing climate control system;

compare at least one respective parameter of the one or more parameters associated with the power source of the vehicle to at least one reference parameter received from the at least one similarly situated reference vehicle; and determine, based at least in part on the comparison, whether the performance inefficiency exists.

* * * * *